(12) United States Patent
Womack et al.

(10) Patent No.: US 12,422,641 B2
(45) Date of Patent: Sep. 23, 2025

(54) FIBER OPTIC SPLITTER MODULES AND SYSTEMS

(71) Applicant: Connectivity Solutions Direct LLC, Mentor, OH (US)

(72) Inventors: Wade J. Womack, Allen, TX (US); Joseph C. Livingston, McKinney, TX (US); Manual Veyna, Jr., Grand Prairie, TX (US)

(73) Assignee: CONNECTIVITY SOLUTIONS DIRECT LLC, Mentor, OH (US)

( * ) Notice: Subject to any disclaimer, the term of this patent is extended or adjusted under 35 U.S.C. 154(b) by 884 days.

(21) Appl. No.: 17/530,772

(22) Filed: Nov. 19, 2021

(65) Prior Publication Data

US 2022/0075137 A1 Mar. 10, 2022

Related U.S. Application Data

(63) Continuation-in-part of application No. 16/932,145, filed on Jul. 17, 2020, now Pat. No. 11,221,455.

(60) Provisional application No. 62/875,499, filed on Jul. 17, 2019.

(51) Int. Cl.
*G02B 6/00* (2006.01)
*G02B 6/44* (2006.01)

(52) U.S. Cl.
CPC ......... *G02B 6/4457* (2013.01); *G02B 6/4446* (2013.01); *G02B 6/44526* (2023.05); *G02B 6/44528* (2023.05); *G02B 6/4482* (2013.01)

(58) Field of Classification Search
CPC .. G02B 6/4452; G02B 6/3897; G02B 6/4446; G02B 6/4457; G02B 6/4482; G02B 6/44526; G02B 6/44528; G02B 6/00
See application file for complete search history.

(56) References Cited

U.S. PATENT DOCUMENTS

| | | |
|---|---|---|
| 7,198,409 B2 | 4/2007 | Smith et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,407,330 B2 | 8/2008 | Smith et al. |
| 7,457,503 B2 | 11/2008 | Solheid et al. |

(Continued)

OTHER PUBLICATIONS

US 9,804,353 B2, 10/2017, Solheid et al. (withdrawn)

(Continued)

*Primary Examiner* — Jennifer Doan
(74) *Attorney, Agent, or Firm* — Johnston IP Law, PLLC

(57) ABSTRACT

In one instance, a fiber distribution hub for use in a passive optical network includes a cabinet having an interior space and a vertical cable management tower extending vertically from a bottom portion of the cabinet or cabinet frame and having a plurality of cable management spools. The vertical cable management tower is coupled to the cabinet or cabinet frame to define a splitter area to one side and a storage area to another side. The hub further includes a plurality of storage spools coupled to the cabinet or cabinet frame in the storage area and a plurality of distribution cables introduced into the interior space of the cabinet and having distribution fibers formed into a plurality of fiber groups at distal ends of the distribution fibers. The plurality of distribution cables is positioned to drape over one or more of the plurality of storage spools for storage until use.

24 Claims, 20 Drawing Sheets

(56) References Cited

U.S. PATENT DOCUMENTS

| | | |
|---|---|---|
| 7,515,805 B2 | 4/2009 | Vongseng et al. |
| 7,519,259 B2 | 4/2009 | Smith et al. |
| 7,720,344 B2 | 5/2010 | Tang et al. |
| 7,809,233 B2 | 10/2010 | Smith et al. |
| 7,809,234 B2 | 10/2010 | Smith et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,980,768 B2 | 7/2011 | Smith et al. |
| 7,995,894 B2 | 8/2011 | Solheid et al. |
| 8,184,940 B2 | 5/2012 | Smith et al. |
| 8,210,756 B2 | 7/2012 | Smith et al. |
| 8,401,357 B2 | 3/2013 | Solheid et al. |
| 8,538,228 B2 | 9/2013 | Smith et al. |
| 8,636,421 B2 | 1/2014 | Smith et al. |
| 8,794,852 B2 | 8/2014 | Barron et al. |
| 8,811,791 B2 | 8/2014 | Solheid et al. |
| 8,818,158 B2 | 8/2014 | Smith et al. |
| 9,122,019 B2 | 9/2015 | Smith et al. |
| 9,201,206 B2 | 12/2015 | Smith et al. |
| 9,250,408 B2 | 2/2016 | Solheid et al. |
| 9,304,276 B2 | 4/2016 | Solheid et al. |
| 9,341,798 B2 | 5/2016 | Smith et al. |
| 9,354,415 B2 | 5/2016 | Nair et al. |
| 9,470,851 B2 | 10/2016 | Smith et al. |
| 9,541,724 B2 | 1/2017 | Solheid et al. |
| 9,784,928 B2 | 10/2017 | Smith et al. |
| 10,126,509 B2 | 11/2018 | Smith et al. |
| 10,151,896 B2 | 12/2018 | Solheid et al. |
| 10,168,491 B2 | 1/2019 | Smith et al. |
| 10,274,686 B2 | 4/2019 | Smith et al. |
| 10,345,539 B2 | 7/2019 | Smith et al. |
| 10,371,915 B2 | 8/2019 | Solheid et al. |
| 10,436,998 B2 | 10/2019 | Solheid et al. |
| 10,527,809 B2 | 1/2020 | Solheid et al. |
| 10,634,859 B2 | 4/2020 | Smith et al. |
| 10,634,860 B2 | 4/2020 | Smith et al. |
| 10,782,497 B2 | 9/2020 | Solheid et al. |
| 10,809,467 B2 | 10/2020 | Smith et al. |
| 11,221,455 B2 * | 1/2022 | Berdan ............... G02B 6/4452 |
| 2011/0123165 A1 * | 5/2011 | Barth ................. G02B 6/4452 |
| | | 385/135 |
| 2012/0201503 A1 * | 8/2012 | Reagan ............ G02B 6/44528 |
| | | 385/135 |

OTHER PUBLICATIONS

U.S. Pat. No. 9,804,353 dated Oct. 31, 2017 in the name of CommScope Technologies LLC (withdrawn and not readily available).

* cited by examiner

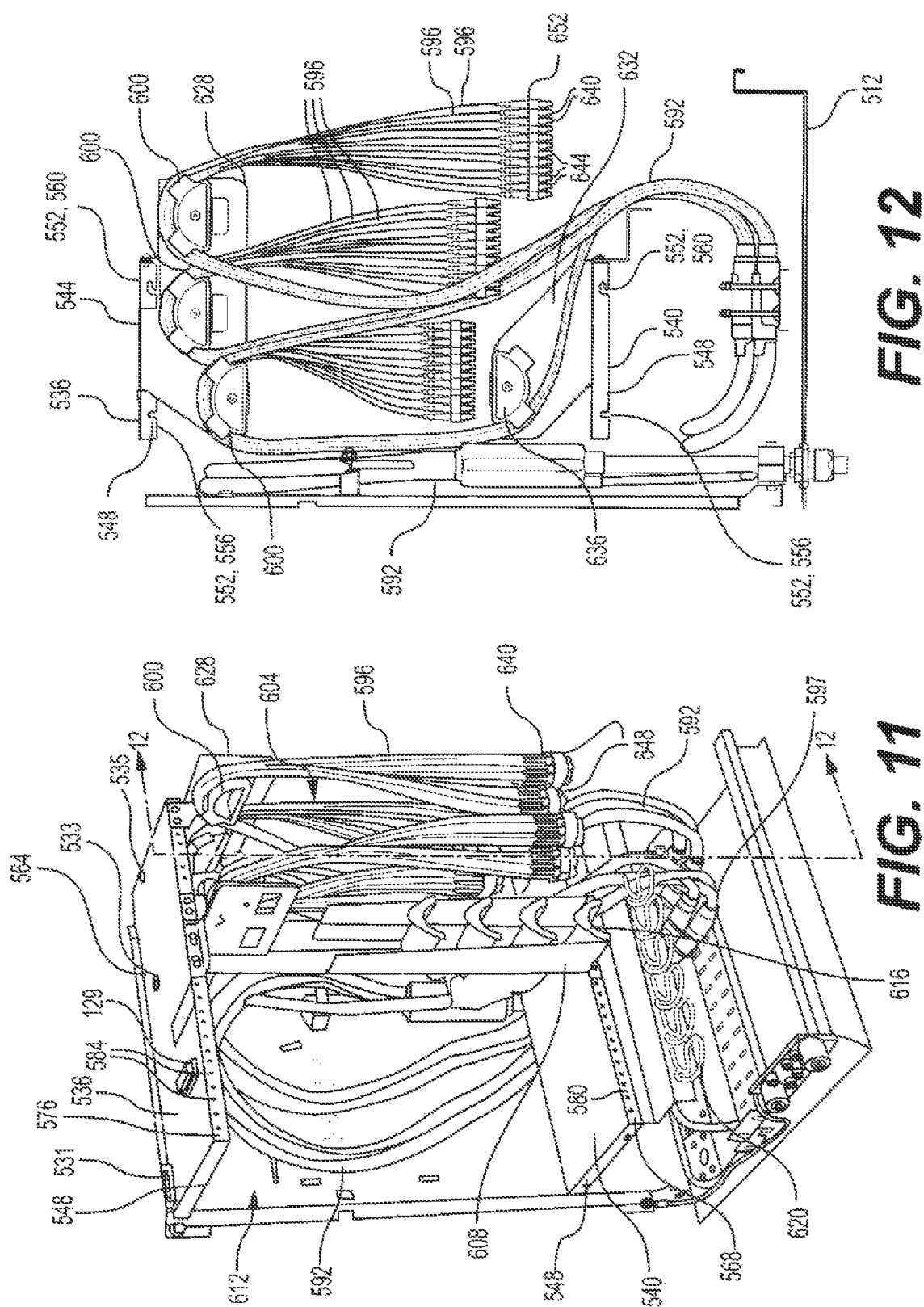

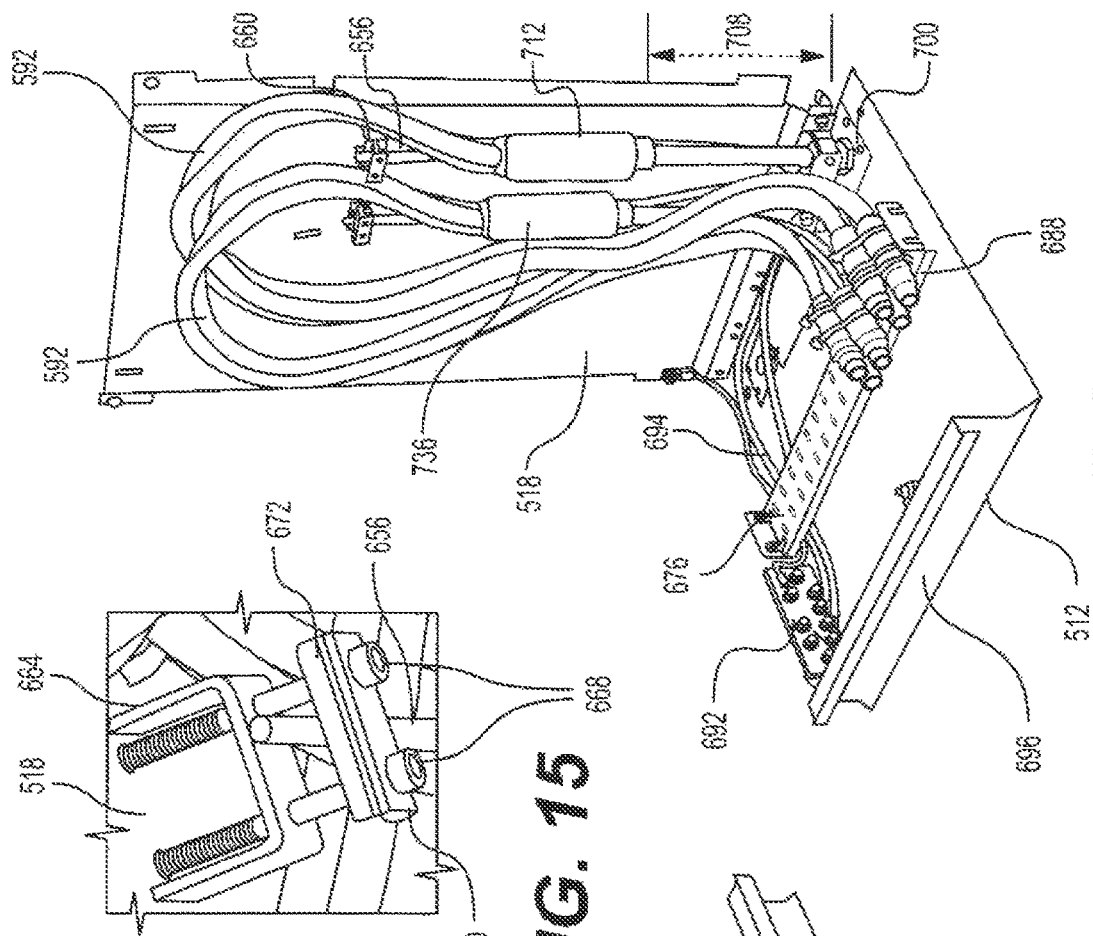
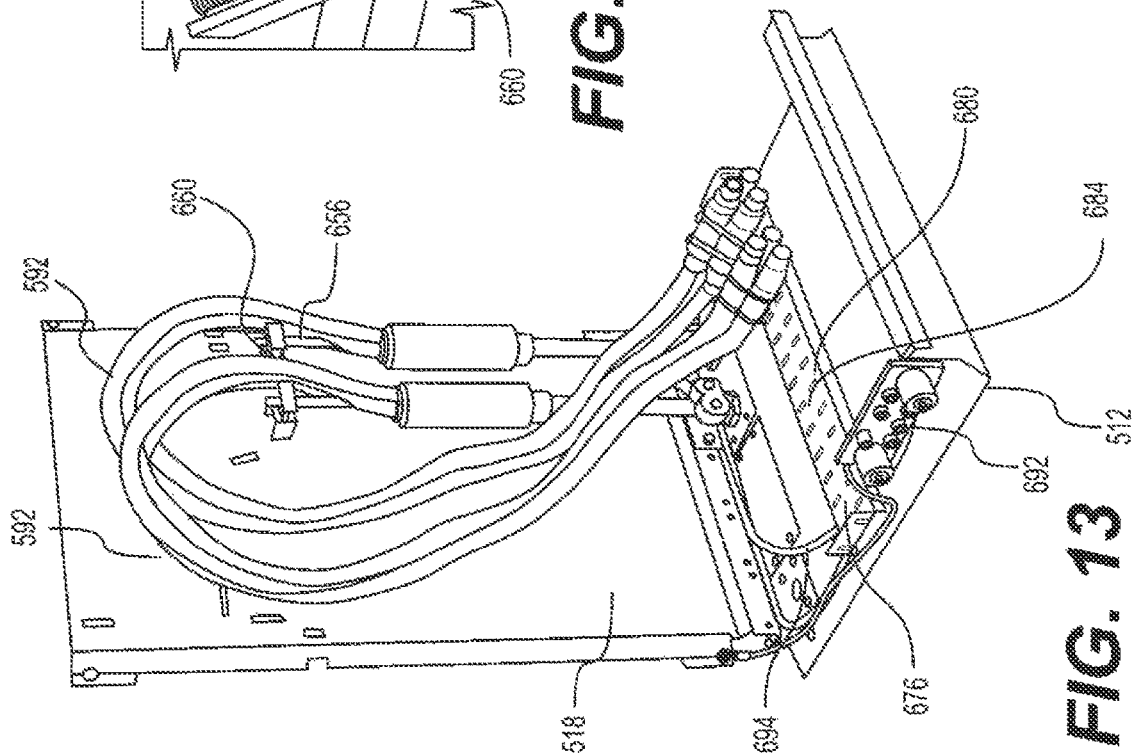

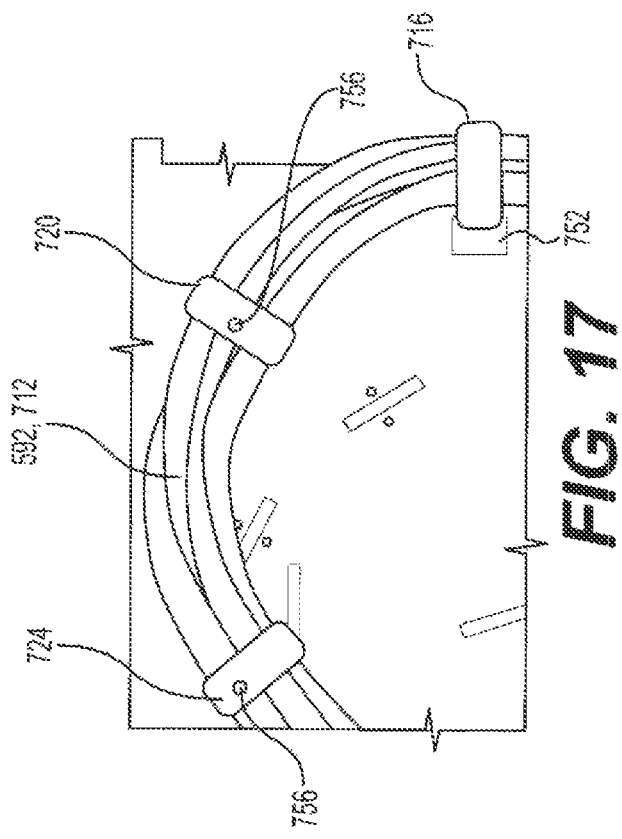
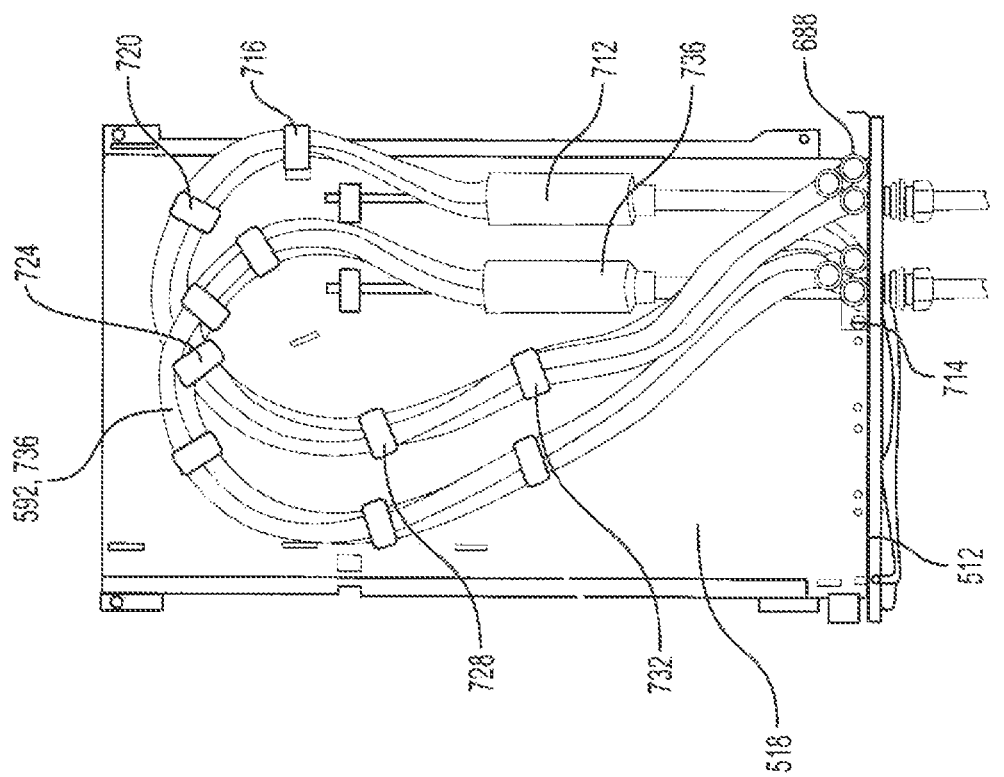
FIG. 17
FIG. 16

FIBER OPTIC SPLITTER MODULES AND SYSTEMS

CROSS-REFERENCE TO RELATED APPLICATION

This application is a continuation-in-part application of U.S. patent application Ser. No. 16/932,145, which was filed Jul. 17, 2020. U.S. patent application Ser. No. 16/932,145 claimed the benefit of U.S. Provisional Application Ser. No. 62/875,499, filed by Brian J. Berdan, et al., on Jul. 17, 2019, entitled "Fiber Optic Splitter Modules and Systems." All these applications are incorporated herein by reference for all purposes.

TECHNICAL FIELD

This application is directed, in general, to fiber optics, and more particular to fiber optic splitter modules or hubs and systems.

BACKGROUND

Passive optical networks have grown in popularity for delivering high-speed communication data and more frequently used now in premises networks. The networks are seen as being desirable, in part, because they do not need to employ active electronic devices, such as amplifiers or repeaters. Such networks include fiber optic splitters and other devices that assist in delivering signals to end users, or subscribers. As passive optical networks increase in popularity and use, improvements are desired.

SUMMARY

According to one illustrative embodiment, a fiber distribution hub for use in a passive optical network includes a cabinet having an interior portion defining an interior space; a top rail and a bottom rail coupled to a portion of the interior portion of the cabinet or an internal frame. The top rail and bottom rail are displaced from one another and extend longitudinally in a first direction that is perpendicular to a gravity field. The hub includes at least one splitter module coupled between the top rail and bottom rail and a plurality of vertical cable management spools coupled to the internal frame or the cabinet and positioned between the top rail and the bottom rail. The hub also has a plurality of storage spools coupled to the internal frame or the cabinet and positioned to one side of the plurality of cable management spools and a plurality of yet-to-be-used distribution fibers grouped into a plurality of fiber groups. The plurality of storage spools is for holding the plurality of yet-to-be-used distribution fibers. The hub also includes a plurality of distribution connectors coupled to ends of the plurality of yet-to-be-used distribution fibers and a plurality of bundle organizers associated with the plurality of distribution connectors of the yet-to-be used distribution fibers, each of the plurality of bundle organizers for receiving distribution connectors.

In one illustrative embodiment, a fiber distribution hub for use in a passive optical network includes a cabinet having an interior portion defining an interior space and a vertical cable management tower extending vertically from a bottom portion of the cabinet or cabinet frame and having a plurality of cable management spools. The vertical cable management tower is coupled to the cabinet or cabinet frame to define a splitter area to one side and a storage area to another side. The fiber distribution hub further includes a plurality of storage spools coupled to the cabinet or cabinet frame in the storage area; and a plurality of distribution cables introduced into the interior space of the cabinet and having distribution fibers formed into a plurality of fiber groups at distal ends of the distribution fibers. The plurality of distribution cables is positioned to drape over one or more of the plurality of storage spools for storage until use.

In one illustrative embodiment, a method of managing fibers within a fiber distribution hub for use in a passive optical network includes providing a cabinet having a first rail separated longitudinally from a second rail and having at least one splitter module between the first rail and second rail, a cable management stand having a plurality of spools, and a plurality of storage spools also disposed between the first rail and second rail; introducing at least one feeder cable into the interior space of the cabinet, the at least one feeder cable having a plurality of distribution fibers with distribution connectors on distal ends; forming a plurality of bundles with a plurality of bundle organizers, each bundle organizer holding a plurality of the distribution connectors or distribution fibers in a spaced relationship; disposing the plurality of bundles over the plurality of storage spools; and coupling at least one of the distribution fibers to the at least one splitter module and using the cable management stand to store any slack in the at least one distribution fiber. Other embodiments and aspects are presented below.

DESCRIPTION OF THE DRAWINGS

Illustrative embodiments of the present disclosure are described in detail below with reference to the attached drawing figures, which are incorporated by reference herein and wherein:

FIG. 11 is a schematic, perspective view of the illustrative embodiment of a fiber distribution hub of FIG. 10 with the outer cabinet removed, and again splitter not shown, for clarity;

FIG. 12 is a schematic, side elevation view of the portion of a fiber distribution hub of FIG. 11;

FIG. 13 is a schematic, perspective view of the illustrative embodiment of the fiber distribution hub of FIG. 11 with additional components removed for clarity;

FIG. 14 is a schematic, perspective view of the illustrative embodiment of the fiber distribution hub of FIG. 13 from a different vantage point;

FIG. 15 is a schematic, perspective view of a detail of FIG. 13 and FIG. 14;

FIG. 16 is a schematic elevation view of the illustrative embodiment of the fiber distribution hub of FIG. 13 showing attachment of distribution cables on the back wall;

FIG. 17 is a schematic detail of a portion of a distribution cable on a backwall from FIG. 16;

DETAILED DESCRIPTION

Figure 1:
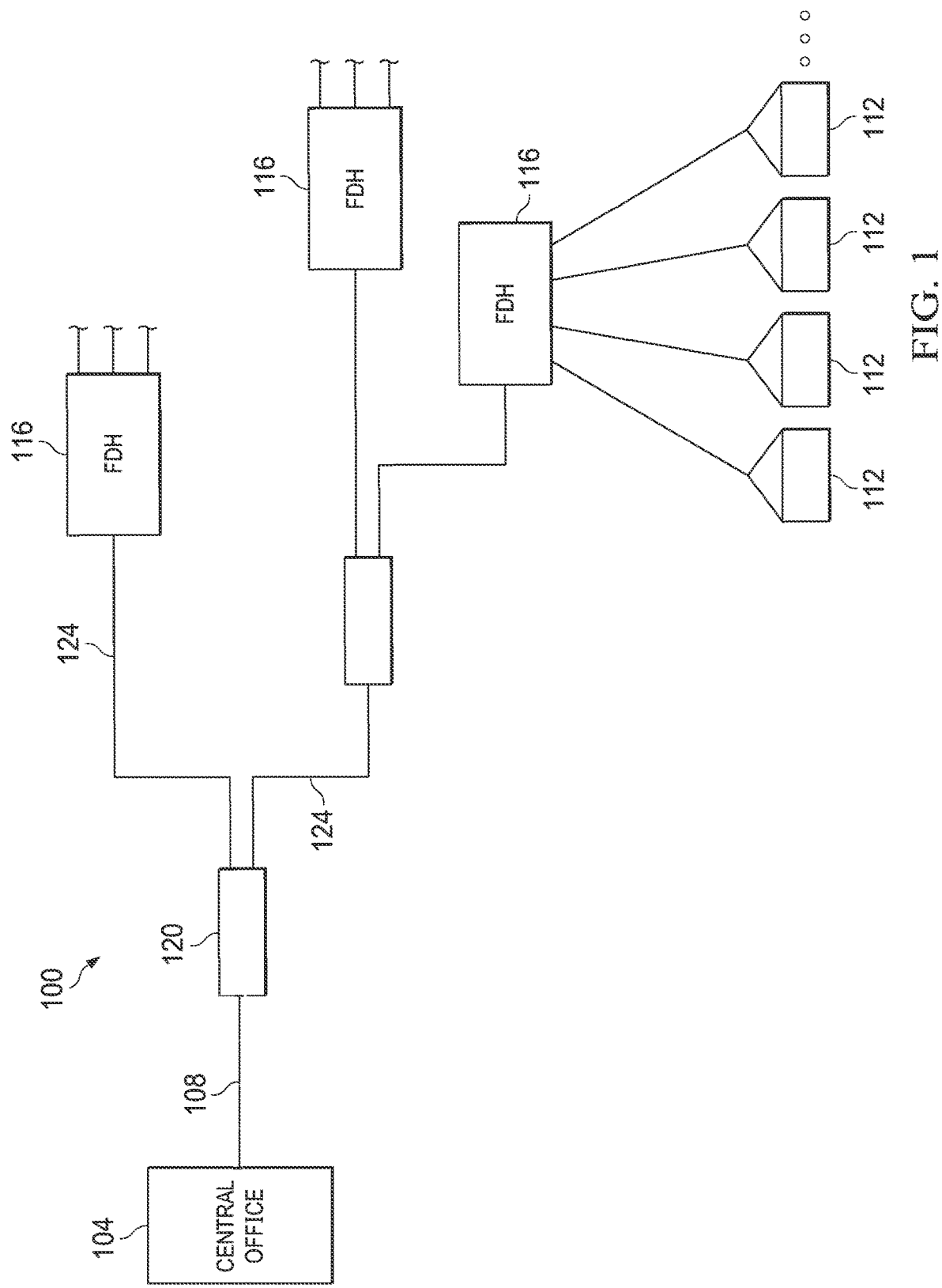
FIG. 1 is a schematic diagram of an illustrative passive fiber optic network.

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

Passive optical networks (PON) are becoming increasingly popular and prevalent for number of reasons. They can deliver high bandwidth communications to customers while avoiding active electronic devices between the central office and the subscriber. In such systems, a signal comes from a central office that connects to a number of subscribers, or end users, in the network. The central office also connects to a larger network such as the Internet. The network can include fiber distribution hubs (FDH; see 116 in FIG. 1) having one or more optical splitter assemblies.

The splitter assemblies generate a number of individual fibers that may be distributed to the premises of an end-user or subscriber. The fibers of the network can be above ground or housed within underground conduits. The network can include a number of breakout locations at which point branch cables are separated out from the main cable lines to go to different locations. The branch cables can be connected to a fiber optic splitter module that include connector interfaces or modules for facilitating coupling of the fibers from the branch cables to the plurality of end users or subscribers. Fiber-optic splitters are used in the fiber distribution hubs to accept one or more feeder cables having a number of fibers that may be split into individual distribution fibers.

To favorably address the impact to the deployment environment, it would be desirable to have smaller fiber distribution hubs that include fiber-optic splitter modules having smaller footprints. As smaller footprints are contemplated, improvements are needed with respect to cable management within the fiber distribution cabinet of the fiber distribution hub.

According to one aspect of the disclosure, in contrast to existing cabinets that have vertical rails (parallel to gravity) with horizontal panels (perpendicular to gravity) added for patch fields (i.e., they expand vertically), an illustrative embodiment presented here has horizontal rails and vertical panels to define the patch fields (i.e., that expand horizontally). The splitter module is oriented 90 degrees from systems used at the present. This is believed to improve the organization and access within the cabinet. This arrangement keeps the field open where one is trying to make changes and it may keep cables more organized in a more natural or automatic way. The splitter assemblies herein can be utilized and numbered differently. As another aspect of the disclosure, the distribution ports may be angled downward (more in the direction of the gravity field) to make cable management easier and more natural. Other aspects are presented further below.

In an illustrative embodiment herein, the ports of a splitter assembly are numbered from the bottom of the splitter assembly to the top and left to right. Whereas, if one makes an analogy of port location and numbering to an Excel spreadsheet, the industry currently starts at A1 (top left) and then goes horizontally to B1 and then C1 etc., and when the right-most top port (out cell in the Excel analogy) is reached, cell A2 is then used. This approach means that the connected distribution cables are laid on top of each other-more with each subsequent row. A technician has to sort through all the cables already patched above while the gravity is pulling them down across available ports; this impairs his or her vision in the patch field as the technician tries to find where to connect.

Referring now to the drawings and initially to FIG. 1, an illustrative passive fiber optic network 100 is presented. The passive fiber optic network 100 includes a central office 104 having passive optical fibers or lines 108 that ultimately connect to one or more subscribers, or end users 112. The central office 104 receives a signal from a larger network (not shown). The passive fiber optic network 100 includes one or more optical fiber distribution hubs (FDH) 116, or local convergence points (LCP). Each fiber distribution hub 116 comprises a splitter assembly having a combined optic splitter and distribution patch field module or system as will be described further below. The fiber lines or cables 108 may include one or more breakout locations 120 where branch cables 124 are separated from main cables 108. As noted above, the disclosure, among other things, presents an improved splitter module for use as an aspect of the fiber distribution hub 116.

Figure 2:
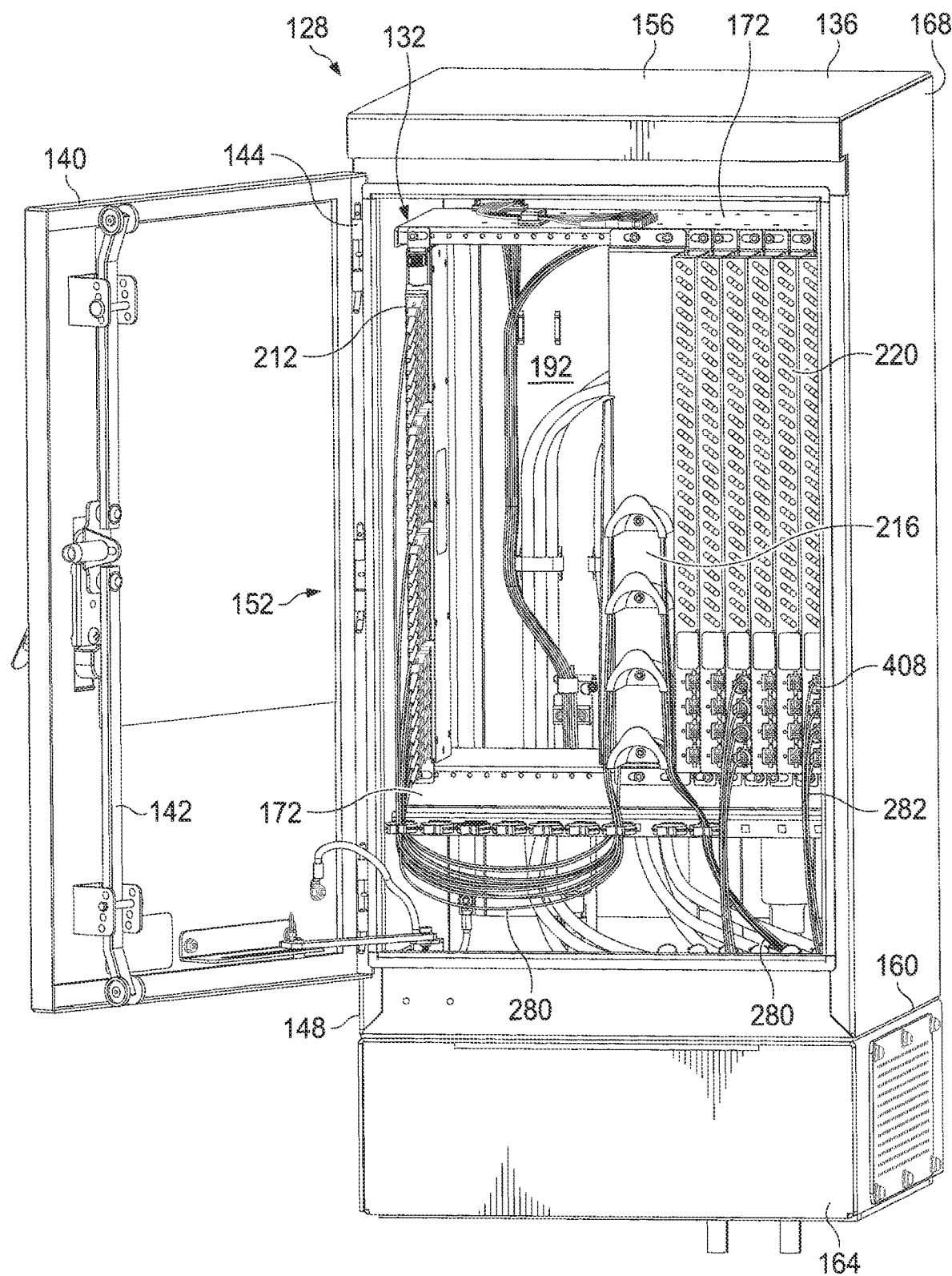
FIG. 2 is a schematic, perspective view of an illustrative embodiment of a fiber distribution hub having an illustrative embodiment of a fiber optic splitter module therein.

Referring now primarily to FIG. 2, an illustrative embodiment of an optical fiber distribution hub (FDH) 128 (116 in FIG. 1), or local convergence point (LCP), is presented that includes an illustrative embodiment of a combined fiber optic splitter and distribution patch field module or system 132, or splitter module 132. The fiber distribution hub 128 comprises a fiber distribution cabinet 136 having a cabinet door or panel door 140 that can swing open to an open position on hinges 144 that are coupled to a main body 148. The cabinet door 140 may include a locking mechanism 142 for securing the door 140 in a closed position and releasing the door 140 to allow for an open position as shown. In the open position of the cabinet door 140, a front opening 152 is accessible. The front opening allows a technician access to the interior. The cabinet 136 may include gaskets in places and vents in others as one skilled in the art would understand. The cabinet 136 includes a top panel 156, a bottom panel 160 that may be on a riser 164, and a plurality of side panels 168 to form an enclosed space for equipment and connections.

The fiber optic splitter module 132 may be mounted within the enclosed space of the cabinet 136 using an internal frame 172. In one embodiment, the cabinet 136 has a rectangular elevational cross section. In one illustrative embodiment, a long dimension of the cross section is 18.125 inches, and a short dimension is 17 inches, but one skilled in the art will appreciate that other dimensions may be readily used. In another illustrative embodiment, the long dimension is 30 inches, and the short dimension is 18.125 inches. The cabinet 136 may have different heights, but in one illustrative embodiment has a height of 31.5 inches, but again other dimensions may be readily used, e.g., a height between 42 and 49 inches. The cabinet 136 may include cable management devices, e.g., rods and spools or storage devices. The illustrative cabinet 136 is shown configured for 288 connectorized fibers (6×48), but other numbers may be used, such as 144, 432, 576, 864, 1782, or other numbers.

Figure 3:
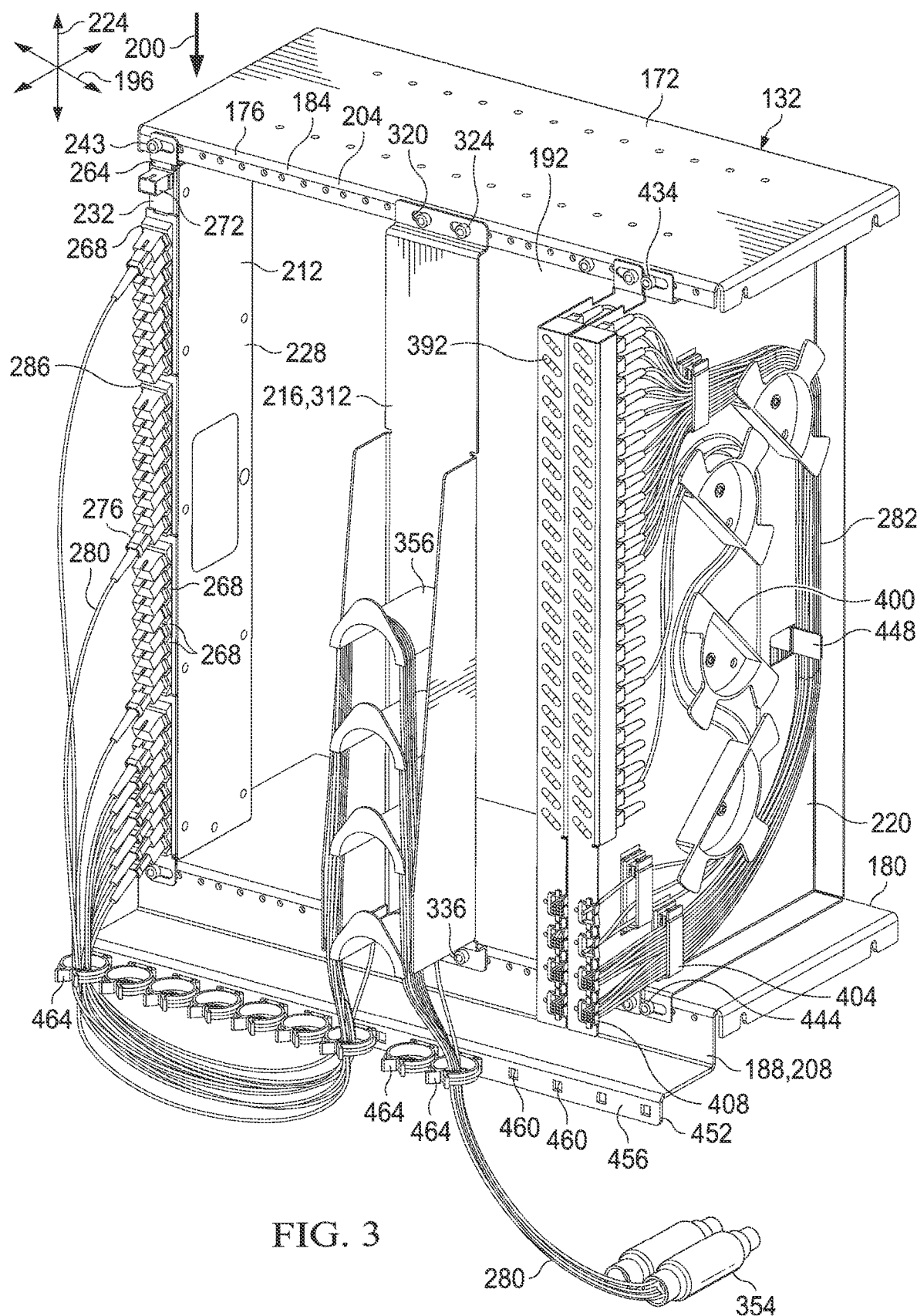
FIG. 3 is a schematic, perspective view of an illustrative embodiment of a fiber distribution hub with cabinet removed for clarity and showing an optical splitter module.

Referring now primarily to FIG. 3, the illustrative embodiment of the fiber optic splitter module 132 is presented in more detail. The fiber optic splitter module 132 comprises certain internal components from the cabinet 136. The fiber optic splitter module 132, when assembled, may include a top rail 184, a bottom rail 188, and a splitter assembly 212. In some embodiments, fiber optic splitter module 132 may further include a vertical cable manager 216 or a storage rack 220.

The fiber optic splitter module 132 has a front side 176 and a back side 180. The fiber optic splitter module 132 includes the internal frame 172 having a top rail 184 and a bottom rail 188, which may be spaced using one or more of the cabinet walls. Reference 192 shows where the back wall or panel of the cabinet 136 would be. The top rail 184 and bottom rail 188 are displaced from one another and extend longitudinally in a first direction 196 (horizontally) that is perpendicular to a gravity field 200. The top rail 184 has a front longitudinal edge 204, and the bottom rail 188 has a front longitudinal edge 208. The rails 184, 188 may be spaced apart from one another a standard 19 inches in compliance with EIA/ECA-310-E, but have been turned 90 degrees from typical industry use. The EIA/ECA 310-E is the rack standard set by the Electronic Industries Association and has been used for many years. Other dimensions for the rails 184, 188 or their displacement from one another may be used in other embodiments.

Coupled to the internal frame 172 is at least one splitter assembly 212, at least one vertical cable manager 216, and at least one storage rack 220 (two shown in FIG. 3). The one or more splitter assemblies 212 is coupled between the top rail 184 and bottom rail 188 and extends longitudinally parallel to the gravity field 200 in a second direction 224, which is vertical. As used herein, "splitter assembly" is meant to be broadly interpreted to include devices that split the signal in any way. In some embodiments the splitter assembly 212 splits the power, splits the signal wavelength, or a combination. In some embodiments, the splitter assembly 212 includes a Planar Light Circuit (PLC) Device, which is a type of optical power management device that features a wide operating wavelength range and good channel-to-channel uniformity and is widely used in PON (EPON/GPON) networks to realize optical signal power splitting. In some embodiments, the splitter assembly 212 includes xWDM's, which are used to combine and separate optical signals transmitted on different wavelengths, which is widely used in optical transmission network and network status monitoring.

Figure 4:
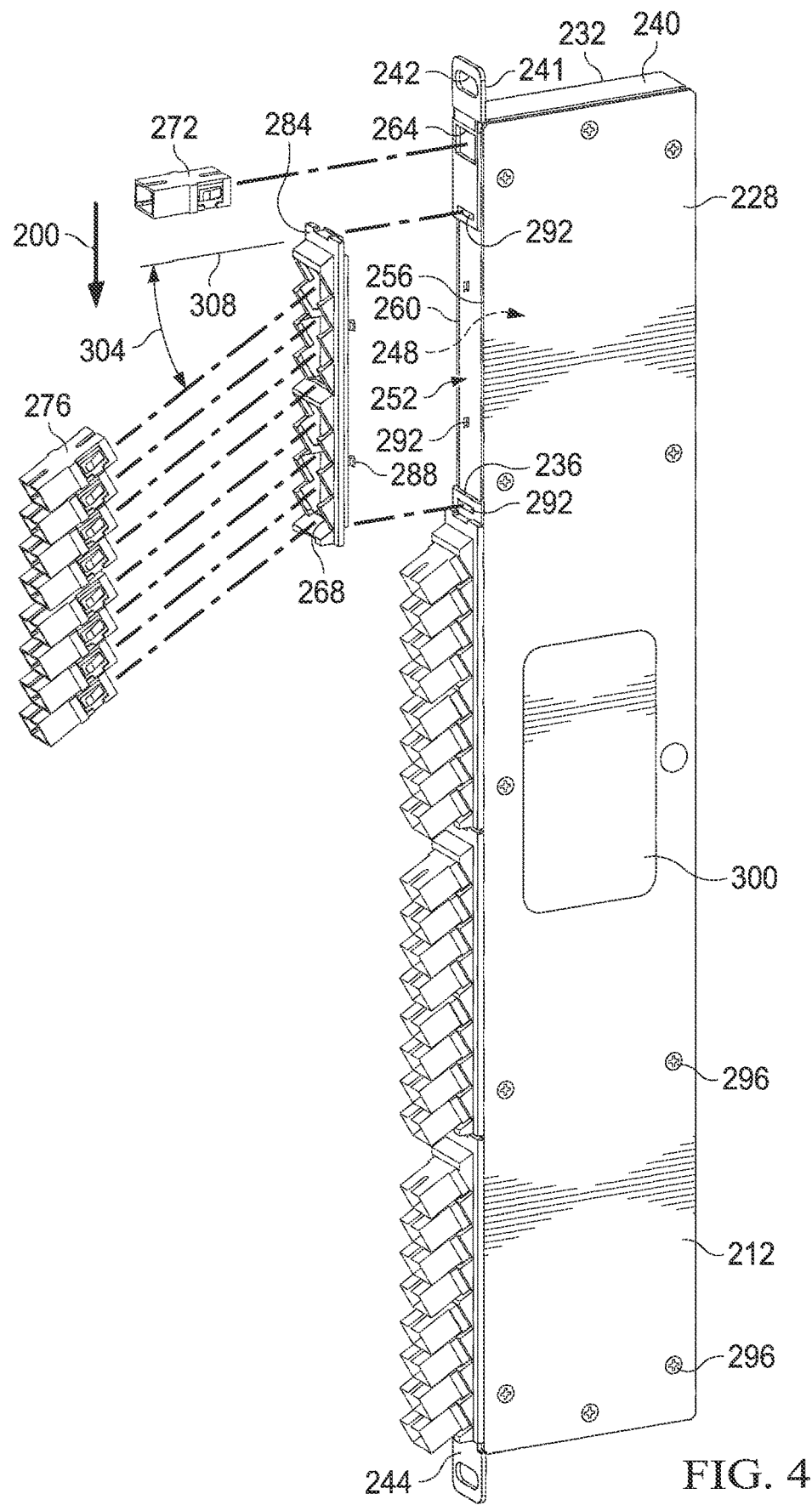
FIG. 4 is a schematic, perspective view of an illustrative embodiment of a splitter assembly for use as an aspect of a fiber optic splitter module of a fiber distribution hub.
Figure 5:
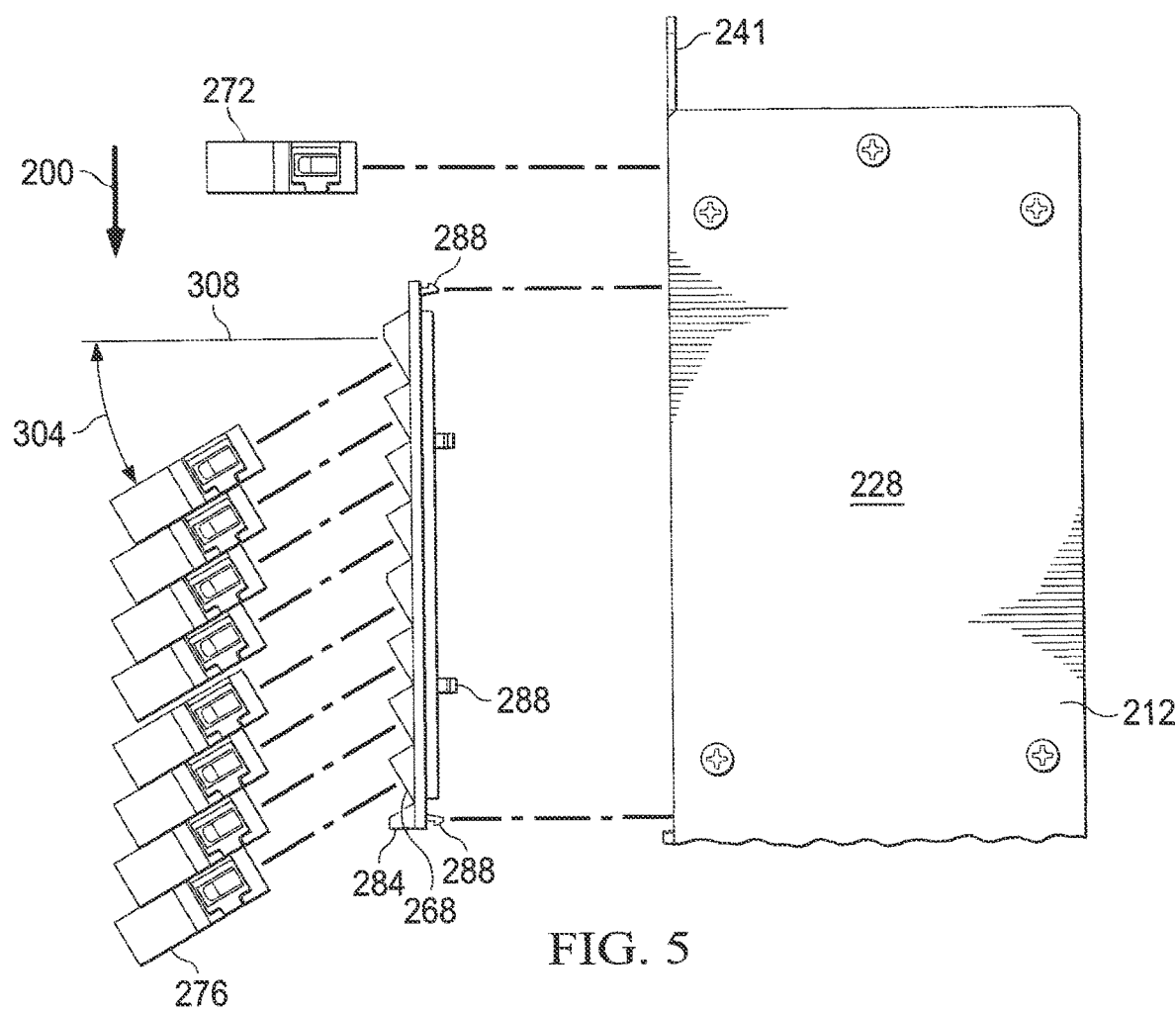
FIG. 5 is a schematic, exploded, elevation view of an illustrative embodiment of a portion of a splitter assembly for use as an aspect of a fiber optic splitter module of a fiber distribution hub.
Figure 6:
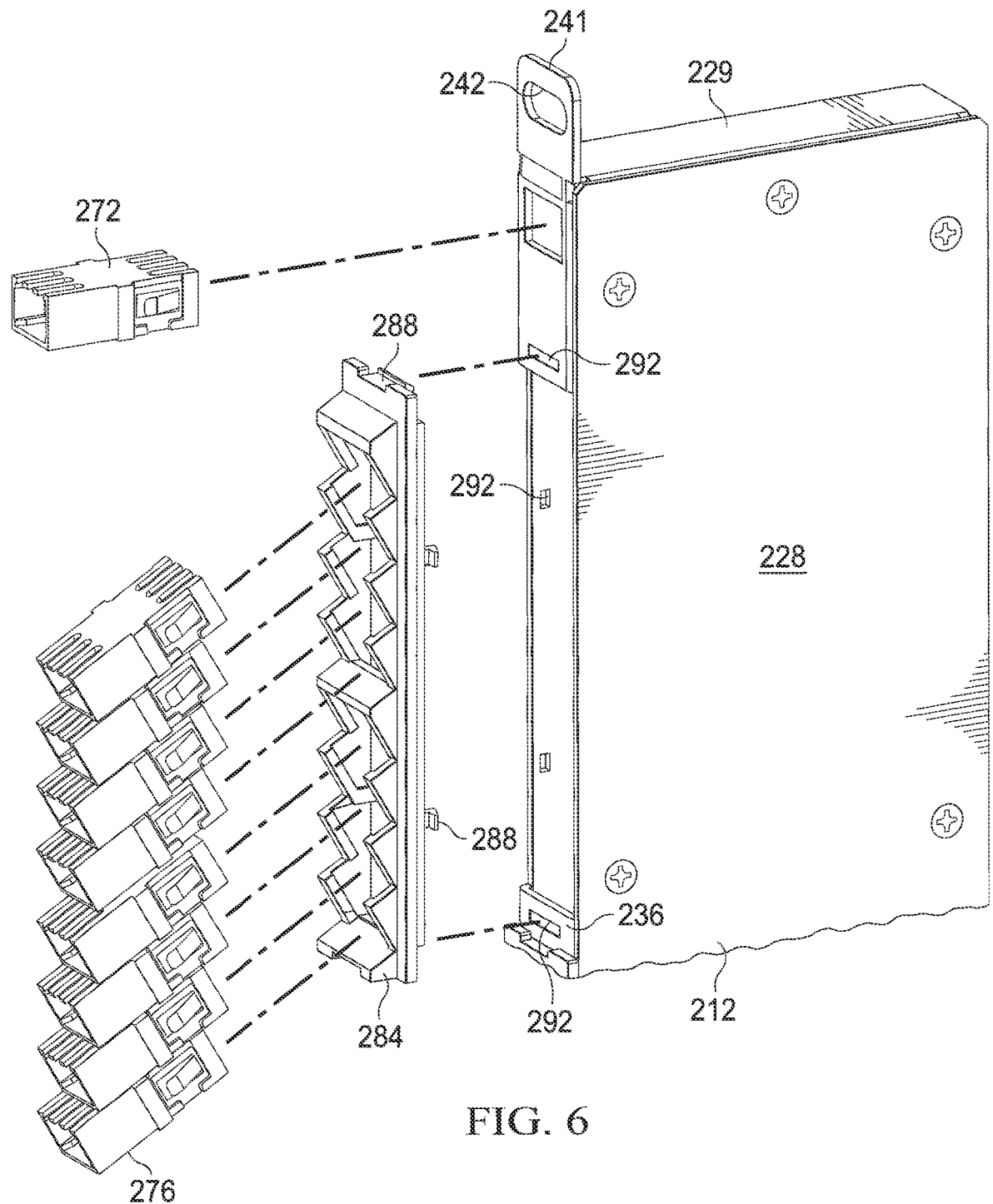
FIG. 6 is a schematic, exploded perspective view of an illustrative embodiment of a portion of a splitter assembly for use as an aspect of a fiber optic splitter module of a fiber distribution hub.
Figure 7:
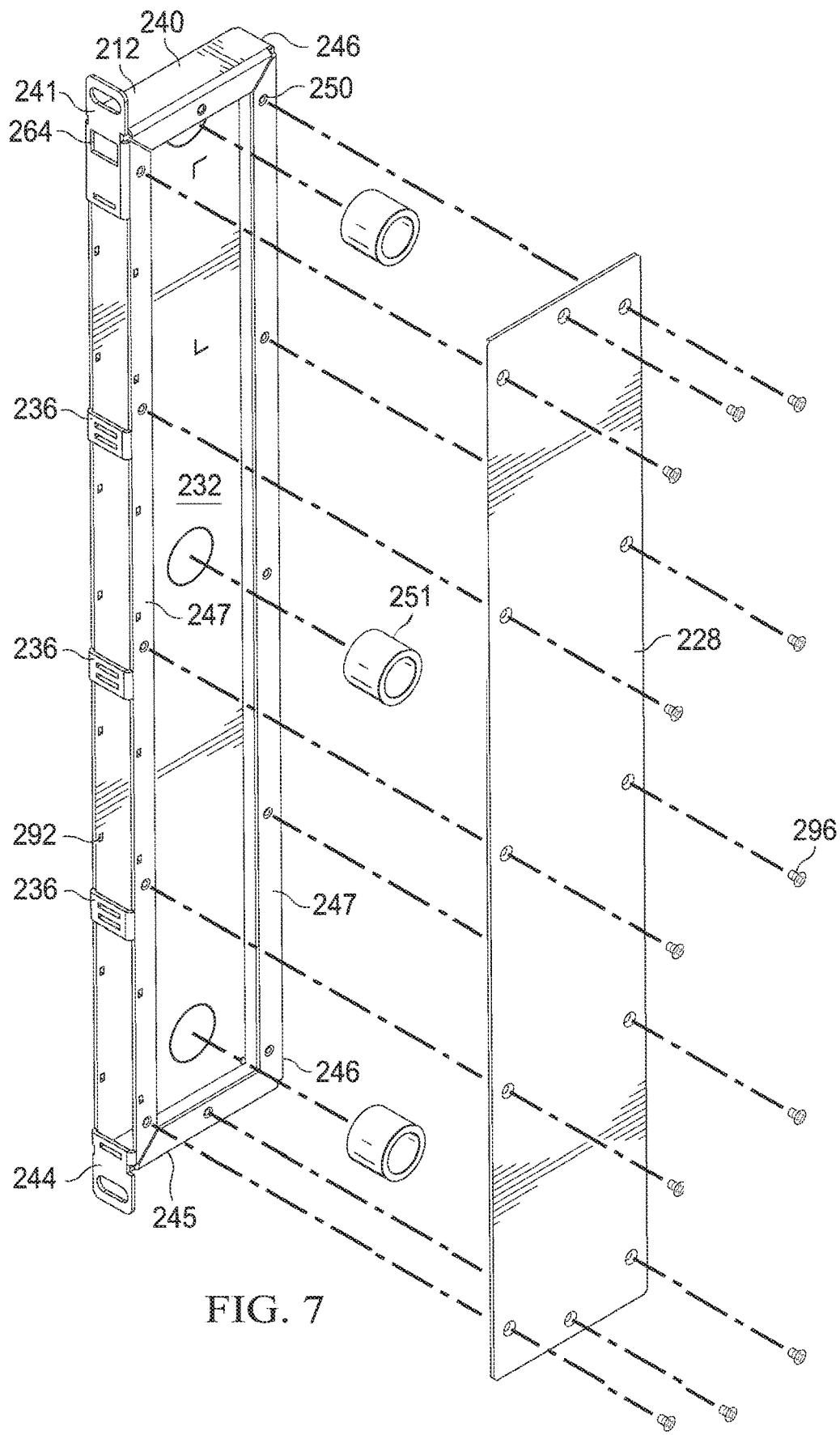
FIG. 7 is a schematic, exploded perspective view of an illustrative embodiment of a portion of a splitter assembly for use as an aspect of a fiber optic splitter module of a fiber distribution hub.

Referring now primarily to FIGS. 3-7, each of the at least one splitter assembly 212 includes a first side panel 228 and an opposed, spaced second side panel 232 (FIG. 4). In some embodiments, the first side panel 228 and second side panel 232 are formed from sheet metal. With reference to primarily to FIG. 7, the splitter assembly 212 may further include a splitter top wall 240, a splitter bottom wall 245, a back wall 246, and a plurality of front wall spacers 236. The first panel 228 may be fastened with fasteners, e.g., fasteners 296, to flanges 247, which may have receiving apertures 250. Once fasteners 296 are in place, the first side panel 228 and second side panel 232 are held in a spaced relationship, and an interior space 248 (FIG. 4) is formed between the first side panel 228 and second side panel 232. The interior space 248 may include internal spools 251 (FIG. 7) for managing cables within the splitter assembly 212. In one embodiment, the internal spools 251 are PVC tubes that are attached at designated locations using an adhesive or other fastener; the spools 251 may be used to help route the cables within the splitter assembly 212. One or more product labels 300 (FIG. 4) may be included on the first side panel 228 or analogously on an exterior of the second side panel 232.

As shown best by FIG. 7, the splitter assembly 212 in some embodiments may be formed from sheet metal components. In some such embodiments, the splitter assembly 212 is formed as a rectangular box with a collar 284 (FIGS. 5 and 6) on the front for the downward distribution ports 268. The splitter assembly 212 forms an enclosed unit. One side of the splitter assembly components, e.g., the one from which the second side panel 232 is formed, is cut and bent at its peripheral edges to make the top wall 240, bottom wall 245, back wall 246, and the front spacers 236 as well as the flanges 247. The other side is just the first side panel 228 that is fastened to the other portion, such as by screws 296 mating with holes 250, or receiving apertures. The holes 250 are on the flanges 247 formed by bending a portion of the first member (e.g., side panel 232) over as shown.

A top flange bracket 241 includes an aperture 242 (FIG. 4) for receiving a fastener 243 (FIG. 3) that couples the top flange bracket 241 to the top rail 184. An analogous arrangement exists for the bottom flange bracket 244. A front opening 252 is formed between a leading edge 256 of the first side panel 228 and a leading edge 260 of the second side panel 232. The front opening 252 of the splitter assembly 212 may have a plurality of front wall spacers 236 across the front opening 252.

The interior space 248 provides space for the optical devices and components to optically couple one or more input adapter ports 264 to a plurality of distribution ports 268. The interior space 248 includes a combination of an optical splitter of the types motioned elsewhere herein as well the distribution patch field. The input adapter port 264 is disposed in an upper portion of the front opening 252 proximate to the top rail 184. The input adapter port 264 is sized and configured to receive an input connector 272 (shown for clarity without an associated cable), which may be configured for any acceptable adapter, e.g., LC, MPO, MDC, SN, CS, SC, or other. Only one input adapter port 264 is shown, but in other embodiments, there may be a plurality of input adapter ports 264.

While the examples shown herein are all single input adapter ports 264, it should be understood that a number, e.g., 2, 3, or 4, input adapter ports may be used and two or more splitter devices may be included within the splitter assembly so that there are for example two 1×8s or two 1×16s, and the like. There can be multiples of the 1×X splitters.

The plurality of distribution ports 268 is disposed in the front opening 252 below the input adapter port 264 and above the bottom rail 188. Each of the input adapter ports 264 is sized and configured to receive a distribution connector 276 of a subscriber distribution cable 280 that optically couples to the end user's location. The distribution ports 268 may be configured for use with any appropriate adapter, e.g., LC, SN, MDC, MPO, SC, CS, or other adapter. The variable configurations allow for different arrangements; for example, in one embodiment, the input port may be an SC adapter and the distribution ports may be SCs. A 2×32 can be accommodated in the same splitter assembly 212 by deploying duplex LCs in place of SCs. In addition, higher density can be accomplished with optical adapter formats, e.g., MPO, SN, MDC, CS. If desired, adapter formats can be mixed in the same splitter assembly 212.

As shown clearly in FIGS. 4-6, a collar or molded collar 284 may be disposed within the front opening 252. The collar 284 may include flexible barbed prongs 288 that are sized and configured to mate with apertures 292 formed on a portion of the splitter assembly housing 229, such as at an end or on a portion of an input adapter port 264 (see FIG. 4) or an aperture 292 on the side panels 228, 232, or on the front wall spacers 236. Other fastener arrangements may be used; for example, screws, rivets, or glue. The collars 284 may be sized to provide for eight angled distribution ports 268 (or any subset of the plurality of distribution ports 268) in each for ease of visualization by the technician. Use of the collars 284 for case of manufacture may create small gaps 286 between distribution ports 268 of different collars at the front wall spacers 236.

As referenced above, the distribution ports 268 may be numbered for reference from the bottom up. With reference to the Microsoft Excel analogy, the very bottom of the first column (first splitter assembly 212) would be cell A1 for a 1×32 splitter. In practice, in most situations, all the distribution ports 268 from the bottom up would be used first. In this regard, FIG. 3 shows some of the upper ports 268 being used sooner, but that is just for demonstration purposes. In other embodiments, different utilization may be made.

As shown clearly in FIGS. 4 and 5, the plurality of distribution ports 268 are angled downwardly. In some embodiments, the plurality of distribution ports 268 on the at least one splitter assembly 212 are downwardly angled at an angle 304 between 15 and 60 degrees from a reference line 308 that is orthogonal to the gravity field 200 as shown. In some embodiments, the angle 304 is 30, 35, 45, 50, 55, or 60 degrees. Other downward angles may be used.

Referring again primarily to FIGS. 2 and 3, the fiber optic splitter module 132 also includes the cable manager 216, or vertical cable manager 216. The cable manager 216 is coupled between the front longitudinal edge 204 of the top rail 184 and the front longitudinal edge 208 of the bottom rail 188.

Figure 8:
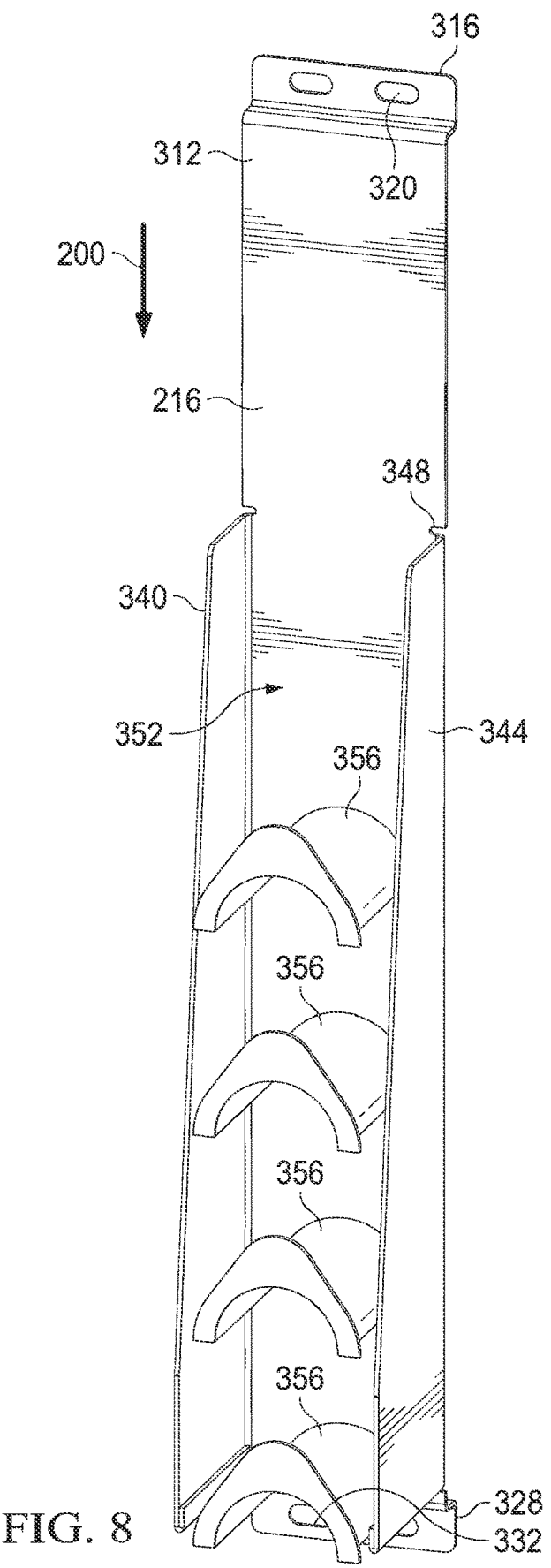
FIG. 8 is a schematic, perspective view of an illustrative embodiment of a vertical cable manager for use as an aspect of a fiber distribution hub including a fiber optic splitter module.

Referring now primarily to FIG. 8, and illustrative embodiment of the cable manager 216 is presented. The cable manager 216 includes a back wall 312 of the cable manager, or cable-manager back wall, that is coupled between the top rail 184 and the bottom rail 188. A top portion of the back wall 312 may be formed with a ledge or flange 316 with one or more apertures 320 through which a fastener 324 (FIG. 3) may be used to couple the flange 316 to the top rail 184. Likewise, a bottom portion of the back wall 312 may be formed with a ledge or flange 328 having one or more apertures 332 for receiving a fastener 336 (FIG. 3) that couples the flange 328 to the bottom rail 188.

The vertical cable manager 216 includes a first cable-manager side wall 340 and a second cable-manager side wall 344. The cable-manager side walls 340, 344 may be formed by bending a winged portion of the back wall 312; notches 348 may facilitate such bends. The back wall 312, the first cable-manager side wall 340, and the second cable-manager side wall 344 form a front cable-management area 352. The cable-management area 352 helps maintain the cables 280 in the desired area and hold the free-form loops. A plurality of cable management spools 356 are coupled to the back wall 312 in the cable-management area 352. The cable management spools 356 are sized to avoid attenuation or damage to the cables 280. The subscriber distribution cables 280 may be managed by placing a portion of the cables 280 on the cable management spools 356 as shown in FIG. 3. As used herein, "spools" includes half spools, full spools, or any partial spools. In the illustrative embodiment shown, the plurality of cable management spools 356 includes four spools, but other numbers might be used.

The distribution cable is referred to as cable 280 when connected to the splitter assembly 212 and as cable 282 when in the yet-to-be-used situation. The distribution cable 280, 282 goes from the end user's facility and figuratively comes in at 354 into the cabinet and transitions from raw cable to breakout cable. The distribution cable 280, 282 enters and fans out there into individual fibers. Before use, the distribution cable 282 is stored in the storage rack 220 as described elsewhere.

At the beginning, before any users are connected, all the subscriber distribution cables 282 are stored and there are no distribution leads plugged into the splitter assembly 212. All the distribution leads of the subscriber distribution cables 282 are the same length. The distribution cables 282 are sized such that when secured in the cabinet 136, all the leads of the distribution cable 282 can hit every area in the patch field at the splitter assembly 212. Because excess slack in the bottom area is undesired, different vertical spools 356 are used to take up slack based on which distribution port 268 is ultimately used by the technician. So, if a high point (top portion) of the splitter assembly 212 is currently the next distribution port 268 available, the lowest (closest to the bottom rail 188) spool 356 is used because there is less length of the cable 280 to absorb or manage. On the other hand, if the next available distribution port 268 is at the bottom portion, the distribution cable 280 is wrapped on the top spool (closest to the top rail 184) because there is more distribution cable 280 to manage. Use of intermediate distribution ports 268 would call for one of the middle spools 356 to be used.

The yet-to-be used distribution cable 282 also has to be managed as it is stored for later use. For this purpose, the fiber optic splitter module 132 also includes the storage rack 220 (See FIGS. 3 and 8). The storage rack 220 is coupled to the top rail 184 and the bottom rail 188. The storage rack 220 extends parallel to the gravity field 200. The storage rack 220 holds or helps manage unused subscriber distribution cables 282 (FIG. 3); that is, distribution cables that have yet to be coupled to one of the plurality of distribution ports 268. The storage rack 220 provides an organized and easy way to store the yet unused subscriber distribution cables 282 before they are used.

Figure 9:
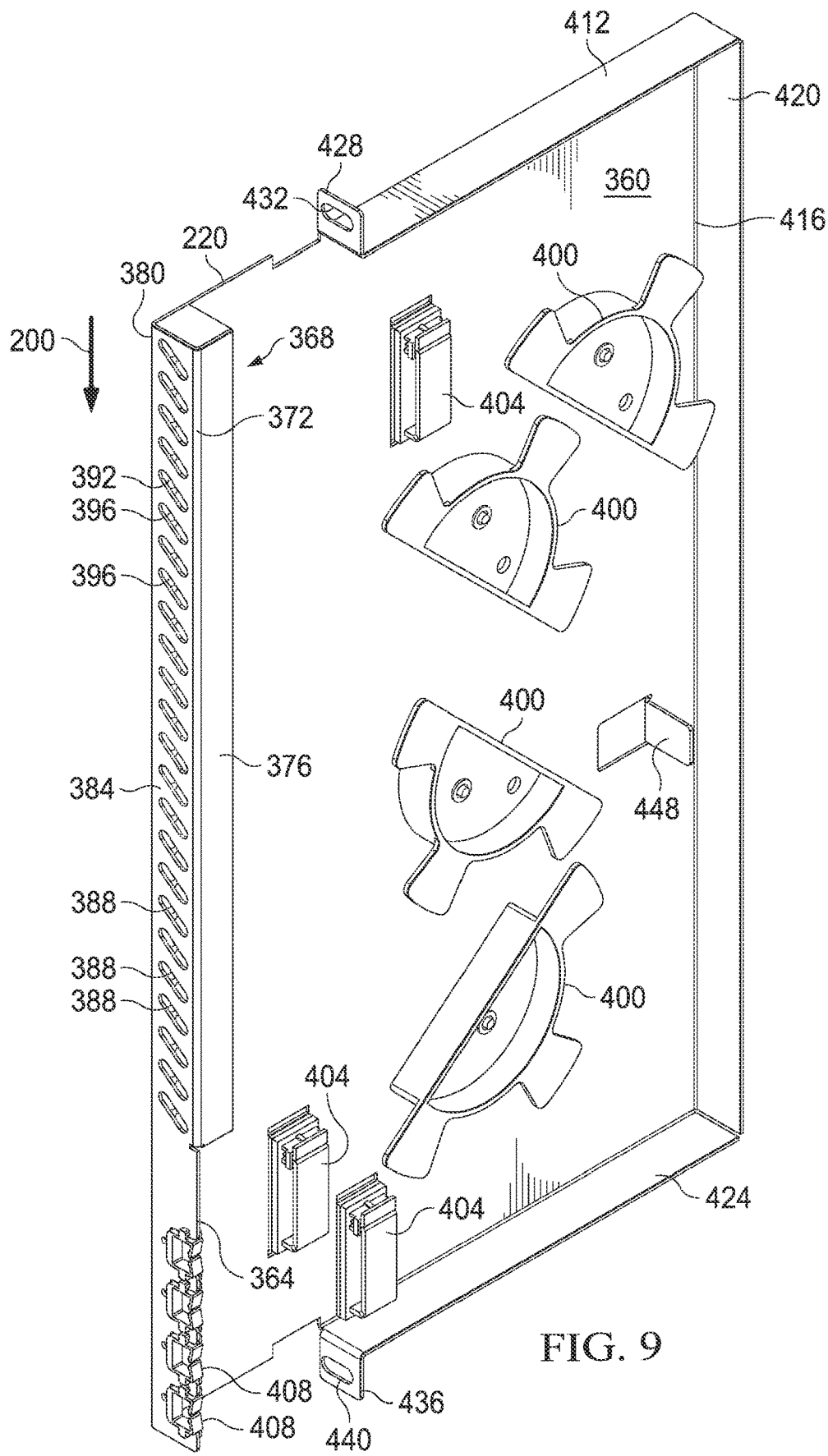
FIG. 9 is a schematic, perspective view of an illustrative embodiment of a storage rack for use as an aspect of a fiber distribution hub which in use includes a fiber optic splitter module.

Referring now primarily to FIG. 9, an illustrative embodiment of the storage rack 220 is presented. The storage rack 220 includes a first storage panel member 360 having a front longitudinal edge 364 that is bent twice at least along a front portion to form a holding channel 368. The holding channel 368 typically extends a length greater than half the longitudinal edge 364 of the front storage panel. The first bend 372 forms a side wall 376 and the second bend 380 forms a front face 384. A plurality of viewing apertures 388 is formed on the front face 384 of the holding channel 368.

An elastic member 392 (FIG. 3), e.g., a foam, such as EPDM, PORON, or the like, is sized and configured to fit within the holding channel 368 and be held there by an interference fit. The elastic member 392 is formed with a plurality of apertures 396 for receiving and holding (by interference fit) ends (with dust caps on) of the plurality of subscriber distribution cables 282 that have yet to be coupled to the plurality of distribution ports 268, i.e., that remained unused by any subscriber. In one embodiment, there are 48 apertures 396 for 48 connectors on the yet-to-be-used distribution cables 282. For manufacturing efficiency, the plurality of apertures 388 may be angled slots that allow a technician to view two different ends of the subscriber distribution cables 282 when backlit through a single slot for identification purposes. In this example, the angled slots angle down from left to right as viewed from the front, but other arrangements are possible. In some embodiments, the plurality of apertures 388 may be associated with the apertures 396 in a one-to-one fashion. Other longer slots, e.g., a vertical slot, may be used in some embodiments.

A number of cable management devices, e.g., cable-management spools 400 and cable-management clips 404, may be coupled to the first storage panel member 360 to assist with management of the yet-to-be-used distribution cables 282. The yet-to-be-used distribution cables 282 may enter the storage rack 220 through and be held by entry slots or ports 408. For clarity, it should be noted that the yet-to-be-used distribution cables 282 in FIG. 3 have been shown as "cut" at the entry slots or ports 408 for visibility but would continue on from the entry slots to the end user's facility or house (see FIG. 2).

The first storage panel member 360 may be bent on its peripheral edges on a top portion to form a top wall 412, bent on its peripheral edge on a back longitudinal edge 416 to form a back wall 420, and bent on its peripheral edge on a bottom portion to form a bottom wall 424. The channel 368 and walls 412, 420, and 424 form a cable management area. A leading edge of the top wall 412 may be bent upward to form a flange 428 having an aperture 432 formed in the flange 428 for securing to the top rail 184 with a fastener 434 (FIG. 3). Likewise, a leading edge of the bottom wall 424 may be bent downward to form a flange 436 having an aperture 440 for securing to the bottom rail 188 with a fastener 444 (FIG. 3).

A portion of the first storage panel member 360 may be partially punched and bent out to form an intermediate wall 448, or cable-chase wall, that functions to form a cable chase. Only one such intermediate wall 448 is shown, but a plurality of such walls may be formed.

Referring again primarily to FIG. 3, the fiber optic splitter module 132 may include a modified L-bracket 452 coupled to the front longitudinal edge 208 of the bottom rail 188. A flange 456 is formed on an outward facing portion of the modified L-bracket 452. The flange 456 has a plurality of clip openings 460. A plurality of ring clips 464, or plurality of patch field holders, is coupled to the flange 456 using the clip openings 460. The modified L-bracket forms a shelf that extends in front of the bottom rail 188 at a distance for holding the cables 280 in a desired plane to allow for good cable management. The ring clips 464 are for receiving and holding at least a portion of the in-use distribution subscriber cables 280.

In one illustrative application of installing a new user or subscriber, the technician would open the door of the cabinet 136 and—after identifying the desired cable 282 associated with the end user to be connected—loosen the fasteners, e.g., screws, at the top and the bottom holding the storage rack 220 to the rails 184, 188, displace the storage rack 220 out the front of the cabinet 136, pull the connector and associated yet-to-be-used distribution cable 282 of choice for the subscriber out of the elastic member 392, and snake the cable 282 through the cable management devices to free the cable 282. The yet-to-be-used cable 282 then becomes a distribution cable 280 ready to be optically coupled to the splitter assembly 212 at a distribution port 268. The technician moves the cable 280 over inside and onto the desired spool 356 of the cable manager 216 according to the length to be managed as described above and puts the cable 280 in the patch field and connects the cable 280 to the next available distribution port 268. After making the patch, the distribution cable 280 is drooped down and coupled to one of the ring clips 464 and then the distribution cable 280 is allowed to rest on its spool 356. The components are then secured before closing the cabinet 136.

According to an illustrative embodiment, a method of manufacturing a fiber optic splitter module 132 for use as a field distribution hub 116 in a passive optical network 100 includes forming an internal frame 172 having a top rail 184 and a bottom rail 188. The top rail 184 and bottom rail 188 are displaced from one another and extend longitudinally in a first direction 196 that is perpendicular to a gravity field 200. The top rail 184 has a front longitudinal edge 204 and the bottom rail 188 has a front longitudinal edge 208. The method further includes coupling at least one splitter assembly 212 vertically between the top rail 184 and bottom rail 188. The at least one splitter assembly 212 extends longitudinally parallel to the gravity field 200 when in an installed position. The at least one splitter assembly 212 may be of one of the types previously described.

The method may also include coupling a cable manager 216 between the front longitudinal edge 204 of the top rail 184 and the front longitudinal edge 208 of the bottom rail 188. The method may also include coupling a storage rack 220 to the top rail 184 and the bottom rail 188 such that the storage rack 220 extends parallel to the gravity field 200. The storage rack 220 holds subscriber distribution cables 282 that have yet to be coupled to one of the plurality of distribution ports 268.

The illustrative embodiments presented offer many potential advantages. Some advantages that might result are referenced here. By having the rails 184, 188 run horizontally, the expansion of additional subscriber connections is horizontal, not vertical. That may help keep the cabinet smaller—certainly shorter. As another possible advantage, the downwardly angled distribution ports 268 may allow for better cable management, which may make the work of the technician easier. Using a standard 19-inch rail that has been turned 90 degrees may offer a number of benefits as well. These are only some of the possible advantages.

In another illustrative embodiment, a fiber distribution hub for use in a passive optical network is formed similar to those referenced above, but with the storage racks 220 removed from a storage area where it now includes storage spools held in the storage area onto which yet-to-be-used fibers may be draped in bundled fiber groupings. The fiber groupings can be held in an organized pattern so that a technician can efficiently get to a desired fiber for utilization. The bundled fiber groupings can be formed with a plurality of bundle organizers that hold the fibers.

Figure 10:
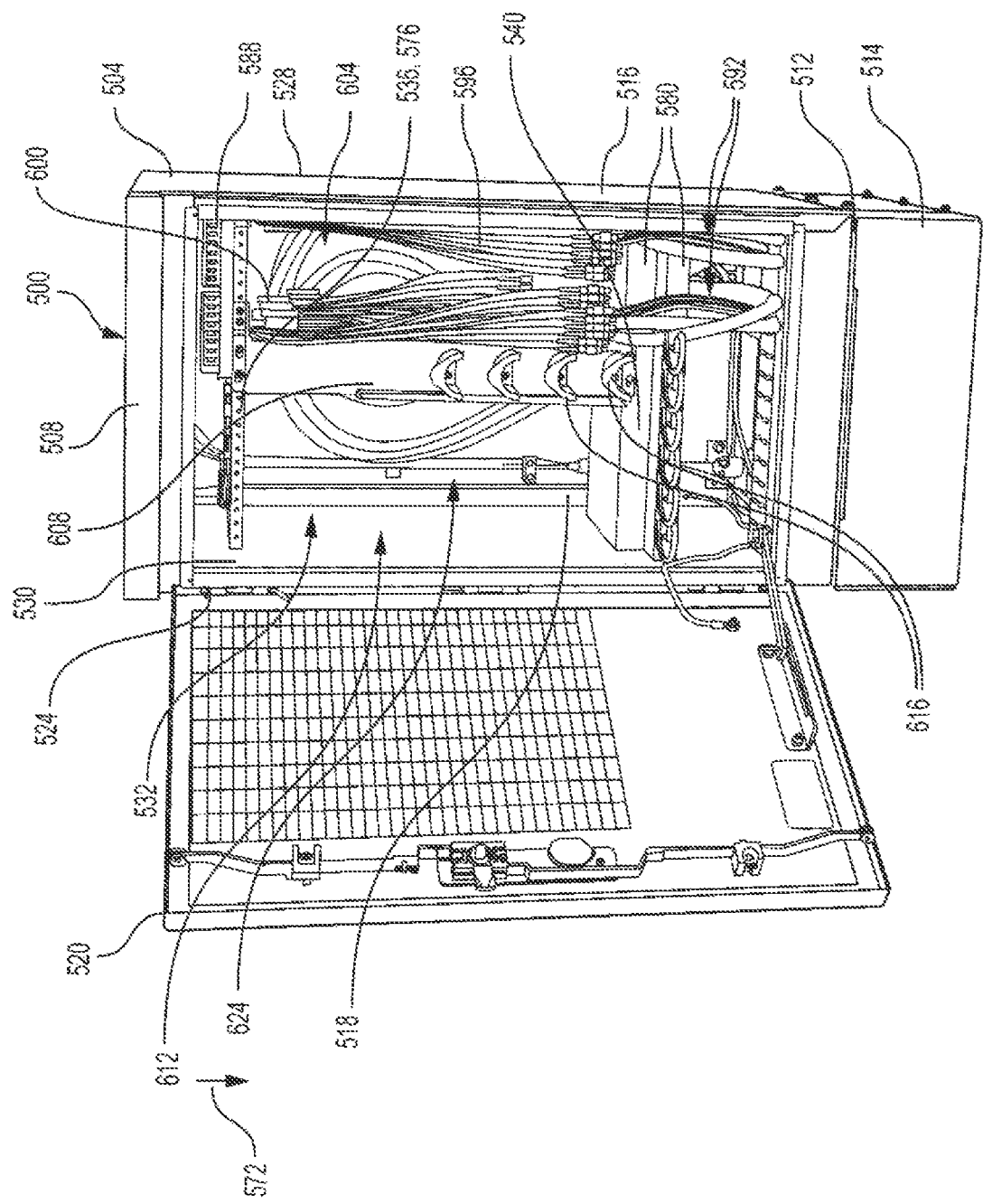
FIG. 10 is a schematic, perspective view of an illustrative embodiment of a fiber distribution hub with splitter not shown for clarity, according to one aspect of the present disclosure.

Referring now primarily to FIG. 10, another illustrative embodiment of an optical fiber distribution hub (FDH) 500, or local convergence point (LCP), is presented that includes a fiber distribution cabinet 504. The splitter modules (see, e.g., 212 in FIG. 3) have been omitted for clarity. The fiber distribution hub 500 is analogous in many respects to the fiber distribution hub 128 (FIG. 2) that was previously presented and for that reason not all the parts or aspects are repeated in describing this embodiment. The cabinet 504 has a first (or top for the orientation shown) panel 508, second (or bottom for the orientation shown) panel 512, a plurality of side panels 516 including back panel 518, or back plate, and a cabinet door 520. The bottom panel 512 may be on a riser 514. The cabinet door or panel door 520 can swing open to an open position on hinges 524 that are coupled to a main body 528 to expose an interior space 532 defined by the interior 530 of the cabinet 504.

Throughout this document "top" and "bottom" are used for convenience with respect to the orientation shown, but those skilled in the art will understand the cabinet could be oriented in different ways in various applications, and no limitation on orientation is intended.

The cabinet 504 has the cabinet interior 530 that defines an interior space 532. Within the cabinet 504 in the interior space 532 is structure to hold items; the structure may be a frame that may be separate, or the structure may be a portion of the cabinet panels. A first shelf 536 (or top shelf for the orientation shown) is coupled (e.g., releasably coupled) at a top portion (for the orientation shown), and a second shelf 540 (or bottom shelf for the orientation shown) is coupled (e.g., releasably coupled) at a bottom portion (for the orientation shown). The shelves 536, 540 may be made of steel or aluminum or other rigid material.

Referring momentarily to FIG. 12, each shelf 536, 540 is formed with a flat planar member 544 and side wings 548. The side wings 548 can be formed with channels or slots 552 for engaging pegs or pins or threaded studs (use with a nut) on the side frame or cabinet 504 and can be in the shape of a straight slot 556 or a dog-leg slot 560. The slots 552 facilitate installation and removal of the shelves 536, 540 in the interior space 532.

Referring again primarily to FIGS. 10 and 11, a first rail, or top rail 564, and a second rail, or bottom rail 568, are coupled to a portion of the cabinet 504 on the interior 530. The top rail 564 and bottom rail 568 are displaced from one another and extend longitudinally in a first direction that is perpendicular to a gravity field 572. The top rail 564 and bottom rail 568 may be formed integrally with the top shelf and bottom shelf respectively. The top rail 564 has a front longitudinal edge 576 and the bottom rail 568 has one or more front longitudinal edges 580. On the front longitudinal edge 576 of the top rail 564 are a plurality of holes or apertures 584. The holes or apertures 584 are drilled and may be mated with threaded screws in some applications. Other fasteners may be used, such as plastic snap rivets. Likewise, the bottom rail 568 may have analogous holes formed. The holes on the top rail 564 and bottom rail 568 may be used for securing splitter modules, storage components, or other devices.

Above the top shelf 536 (again for the orientation shown) is a pass-through panel 588. In contrast, in the embodiment of FIG. 2 the pass-through panel was on the right side against the wall. The pass-through panel 588 receives leads that are not used in the splitter modules (see 212 in FIG. 2). The pass-through panel 588 holds the leads to be used for customers getting unsplit bandwidth.

One or more distribution cables 592 enter from the bottom portion of the cabinet 504. The distribution cables 592 are configured to run along the back wall or panel 518. The back wall or panel 518 may have different features (e.g., coordinated lances) to facilitate routing of the distribution cables and the feeder cable 624.

In this illustrative embodiment, a plurality of fibers 596 from the distribution cables 592 (on the distal ends) is no longer dressed into storage trays. Rather, the distal ends of the plurality of fibers 596 are gathered into fiber groups (described further below) and hang or drape on storage spools 600. Again, as used herein, "spools" includes full, half, or partial spools. In this embodiment, the storage spools 600 are in a storage area 604 to one side of the cable management tower 608. One or more of the storage spools 600 may be staggered vertically; for example, the left-most storage spool 600 in FIG. 12 is lower than the other two storage spools 600. In other embodiments, they may all be staggered by placement or by the horizontal placement as well be a shorter distance for some and thus allowing for a different height to be realized by the distal ends of the fibers. All the ends of the fiber groups may be staggered in height.

To the other side (opposite the storage area) of the cable management tower 608 is a splitter area 612. Splitter modules (212 in FIG. 3) are attached to the top rail 564 and bottom rail 568—or the top shelf and bottom shelf. In one embodiment, nine splitter modules extend between the top rail 564 and the bottom rail 568.

The cable management tower 608, or in this embodiment the vertical cable management tower, includes cable management spools 616. After a distribution lead, the particular fiber 596, has been selected for service, the fiber 596 is taken out of the storage spools 600 and dressed over to the left-hand side (for orientation shown) of the cabinet 504 to go to a splitter (see, e.g., 212 in FIG. 3) and then storage of any slack in the fiber is stored using the plurality of vertical management spools 616. None of the splitter modules are installed typically when the cabinet is shipped.

The bottom shelf 540 or bottom rail 568 may have a plurality of apertures formed to receive bridle rings 620, e.g., metal bridle rings, for holding and organizing cables. The bridle rings 620 hold the cable leads, or fibers, as they dress into the splitter modules above.

Referring now primarily to FIGS. 11 and 12, the fiber distribution hub 500 of FIG. 10 is presented without the outer cabinet 504, feeder cable, and some components for clarity. The plurality of storage spools 600 are clearly shown coupled to the internal frame or the cabinet on spool support arms 628 at a location between the top rail 564 and the bottom rail 568. The spool support arms 628 may be coupled to the top shelf 536 or the frame interior in some other fashion. There may also be a lower support arm 632 for holding a lower cable management spool 636 (FIG. 12) to position fiber 596. The storage spools 600 may be coupled using a fastener, e.g., a bolt, to the spool support arm 628.

The plurality of fibers 596 from the distribution cables 592 have a plurality of fiber groups 640 on the distal ends for organizing the yet-to-be-used fibers for easy systematic access by a technician. More specifically, the plurality of fibers 596 have a plurality of distribution connectors 644 (see also FIGS. 20, 24-28), coupled to the distal ends that are held in an organized, patterned fashion by a plurality of bundle organizers 648 (see FIGS. 19-28). As described in more detail further below, each of the plurality of bundle organizers 648 may have a plurality of channels or openings for receiving the distribution connectors 644 or other aspects. The bundle organizers 648 may further include a wrap 652, e.g., a hook-and-loop strap or belt strap, coupled around an exterior for releasably securing the distribution connectors 644 in the bundle organizer 648. The wraps 652 may be of different colors as described further below.

With reference primarily to FIGS. 10 and 11, a pass-through panel 588 (FIG. 10) is placed on top of the top shelf 536 and is accessible there. One or more lances 129 or attachments may be placed on the top shelf 536. In one embodiment, the pass-through cables may come up proximate numeral 531 and run to an interface positioned approximately between 533 and 535 (FIG. 11).

Referring now primarily to FIGS. 13 and 14, the fiber distribution hub 500 is presented with primarily the bottom panel 512, back panel or wall 518, and the distribution cables 592. This view shows the routing of the distribution cables 592 in one illustrative embodiment. In this view, the central strength member (CSM) 656 is visible as held by a cable clamp 660. As shown best in FIG. 15, which is a detail of the cable clamp 660 of FIGS. 13-14, the cable clamp 660 may be formed with a base member 664, such as a u-shaped base member, coupled to the back wall 518 that receives fasteners 668, e.g., bolts, that selectively move a wedging plate 672. Thin nuts (not explicitly shown) may be pressed on the back wall to receive the fastener. The central strength member 656 is put into compression between the wedging plate 672 and an outer surface of the base member 664 to secure the central strength member 656 relative to the back wall 518. In one embodiment, the cable clamp 660 is stainless steel. The same or analogous type of clamp 660 may be used with the feeder cable 624 as well.

A cable tie down bracket 676 is, when assembled, coupled to the side panel 528 and above the bottom panel 512. The cable tie down bracket 676 features two rows of spaced lances 680 and 684. The lances 680, 684 receive cable ties to hold transitions 688 on the distribution cables 592. A bottom bus bar 692 is also visible as are the ground wires 694. A portion of the member that forms the bottom panel 512 may be folded to form a front surface 696 of the cabinet 504.

With reference primarily to FIG. 14, the distribution cable 592 enters through the bottom panel 512 at aperture plate 700 and is secured by the cable gland, which transitions to the primary transition tube 712 and 736. The transition tube is offset a distance 708 before starting a routing pattern with a service loop and arriving at the second transition 688, which is coupled to the cable tie down bracket 676 and from which the fibers 596 with distribution connectors 644 (FIG. 12) extend. In one embodiment, the fibers 596 extending from the transition 688 comprise 44 inches of 2 mm leads with connectors on the ends. In one embodiment, the aperture formed under aperture plate 700 that goes through the bottom plate 512 is sized to allow the plurality of connectors 644 on the fibers 596 to go through.

Referring now primarily to FIG. 16, a front elevation view of a portion of the fiber distribution hub 500 showing the bottom panel 512 and back panel 518 of the cabinet 504. In this view one may appreciate that the back panel 518 has plurality of lances formed thereon that may be used with hook-and-loop straps or other straps to secure distribution cables 592. A lance is a sheet metal punch out (or equivalent if another material is used) that forms a bridge connected on both ends or one end. In some embodiments, the lances may be attached with fasteners or adhesives.

A first distribution cable 712 enters the cabinet 504 through bottom panel at right-most opening in aperture plate 700 (FIG. 14), is secured with a clamp and forms a first service loop that is held by the plurality of straps and in particular straps 716, 720, 724, 728, 732 each mating with a lance on the back panel 518. When running the first distribution cable 712, the technician can know which pattern of lances forms the first service loop by a number of holes through the back panel 518 next to the involved lances.

Figure 18:
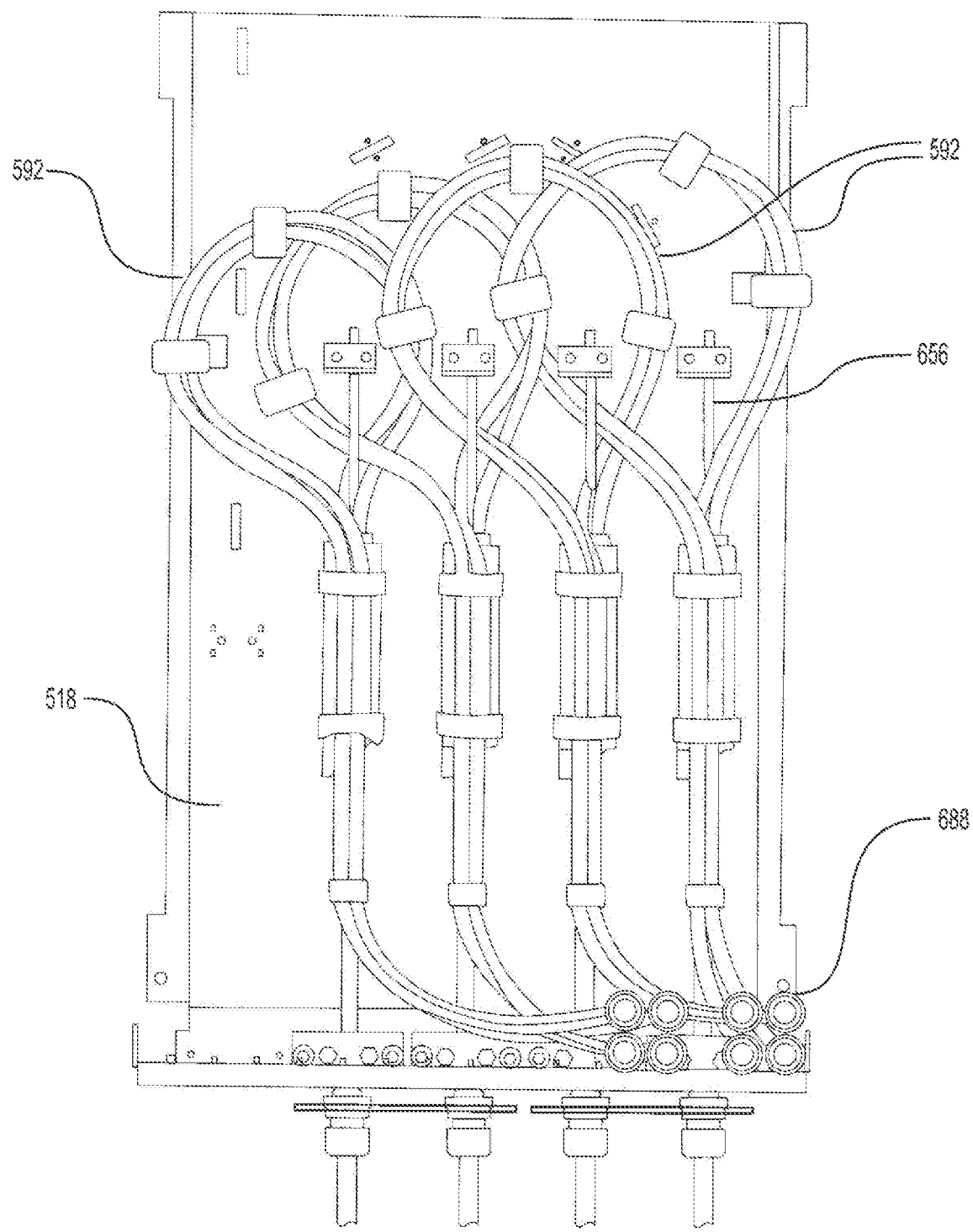
FIG. 18 is a schematic elevation view of the illustrative embodiment of the fiber distribution hub of FIG. 13 but modified to show attachment of distribution cables on the back wall with four cables.

FIG. 17 shows the first service loop using wraps 720 and 724 with associated lances (behind the wraps in this view) and wrap 716 with an edge aperture 752. The edge aperture 752 is used instead of a lance because of proximity to an edge of the panel 518. The lances have a single aperture 756 showing which lances to use; in other words, the technician just follows the lances with one aperture formed next to them. Two apertures may be used with the other patterns and other numbers of apertures with still other cables. In this regard, FIG. 18 shows a front elevation view of a portion of the fiber distribution hub 500 having four grouped distribution cables and each lance for each one may have different number of apertures next to it to signify which ones to use.

Figure 20:
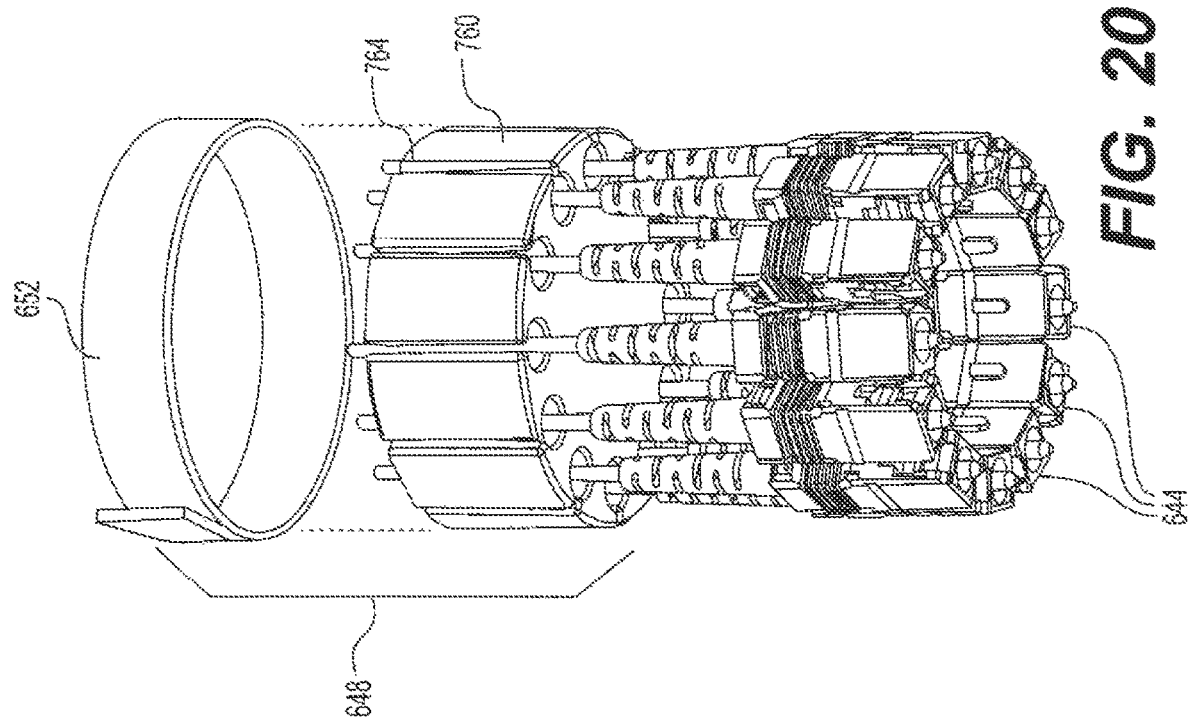
FIG. 20 is an exploded view of the illustrative embodiment of the bundle organizer of FIG. 19.
Figure 19:
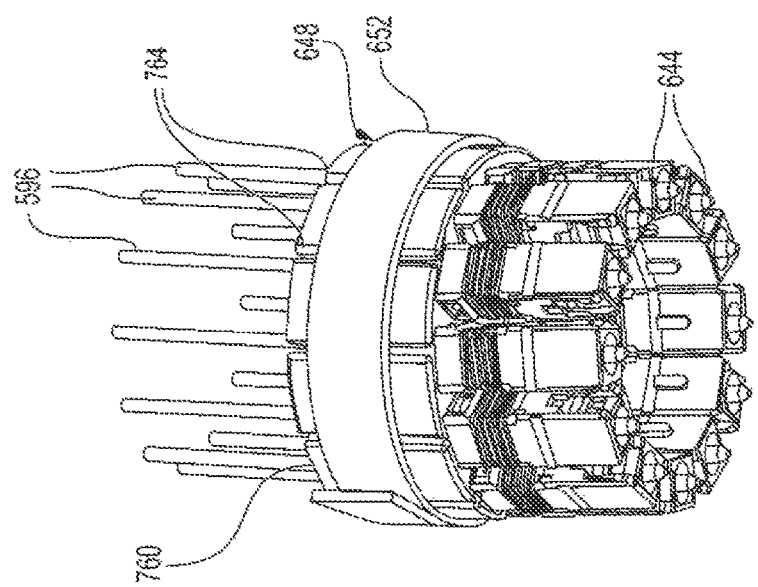
FIG. 19 is a schematic, perspective view of an illustrative embodiment of a bundle organizer for holding a plurality of fibers with distribution connectors coupled to the distal ends.

Referring now primarily to FIGS. 19 and 20 and to a lesser extent to FIGS. 11 and 12, the plurality of fibers 596 have a plurality of distribution connectors coupled to the distal ends that in one embodiment may be held in an organized, patterned fashion by a plurality of bundle organizers 648. Each of the plurality of bundle organizers 648 helps to form a substantially circular—arcuate—or polygon arrangement of the involved connectors 644 by gripping the connector boots or another aspect. Each of the plurality of bundle organizers 648 in some embodiments involve an independent set of 12 fibers 596 with four or six groups. Each of the plurality of bundle organizers 648 includes a spacing hub 760. The spacing hub 760 may take numerous forms-formed members, adhesive tape, plates, etc. In one illustrative embodiment, the spacing hub 760 has a plurality of channels 764 or through-holes for receiving distribution fibers 596 or connector boots 644 and an exterior wrap 652 for surrounding the spacing hub 760 and selectively securing the distribution fibers or more specifically portions of the connectors 644 therein.

In some embodiments, the spacing hub 760 includes a formed member having the channels 764 on an exterior proximate the periphery. The channels 764 are outside slots on the exterior and engage the connector boots or another aspect, and the exterior wrap 652 tightens the channels 764 to hold the distribution fibers or distribution connectors 644 therein when in an assembled position and wherein the channels 764.

The wraps 652 may be color coded to assist the technician. For example, the wraps 652 may have colors according to the Telecommunications Industry Association's TIA-598-C Optical Fiber Cable Color Coding. TIA standards have color sequence: blue, orange, green, brown, slate, white, red, black, yellow, violet, rose, and aqua (first 12 colors). All subunits and cables are based on that 12-fiber sequence. In one embodiment, there are 144 fibers 596 coming in on each of two main distribution cables 592—each of those 144 are divided into 12 groups of 12. So, there is a subunit in the primary cable that is blue and has blue through aqua fibers in it. The second subgroup of 12 is an orange subunit and has 12 fibers it. The twelve colors of the wraps 652 designate the 12 subunits within each cable. In this way, a technician knows that fiber No. 136 is in the 12 subunit which is aqua and makes it easier to locate.

Figure 21:
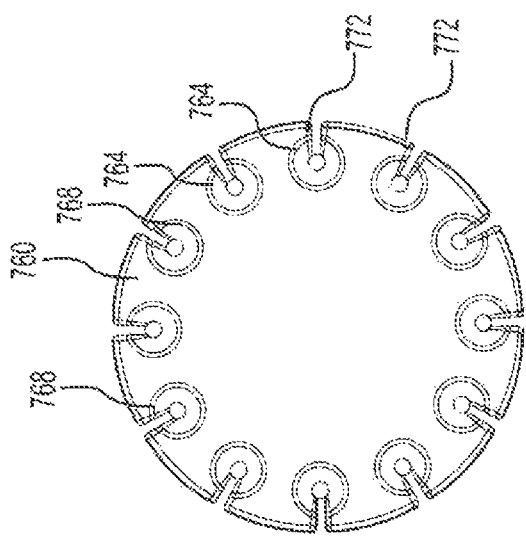
FIG. 21 is a schematic plan view of an illustrative embodiment of a spacing hub of an illustrative embodiment of a bundle organizer.

Referring now primarily to FIG. 21, an end view of a spacing hub 760 is presented. The spacing hub 760 includes channels or apertures 764. The channels 764 may include a chamfered edge or beveled edge 768. In FIG. 21, all the channels 764 are spaced around the outer edge or periphery of the spacing hub 760 and the openings allow the channels 764 to become more restricted as the wrap 652 (see FIGS. 19-20) is tightened. The spacing hub 760 of FIG. 22 is analogous to that of FIG. 21 except in addition to the channels 764 along the periphery there are a plurality of channels 776 on an interior portion.

Figure 23:
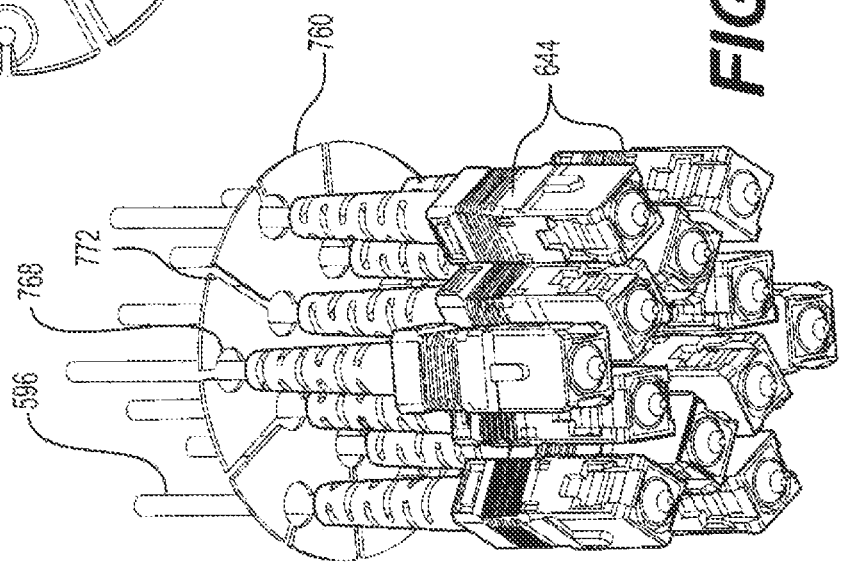
FIG. 23 is a schematic, perspective view of another illustrative embodiment of a bundle organizer for holding a plurality of fibers with distribution connectors coupled to the distal ends.

The spacing hub 760 of FIG. 23 is another illustrative embodiment and involves the spacing hub 760 being a plate member with relatively little thickness. For example, if the diameter of the spacing hub 760 is L, the thickness (longitudinal length) is less than 3% of L. It also shows the connectors 644 being put in place so that the spacing hub 760 engages the connector boots. It should be understood that in some embodiments, the fibers 596 may be placed through the openings 772 in the channels and the connectors pulled to enter a portion of the channel 764.

Figure 22:
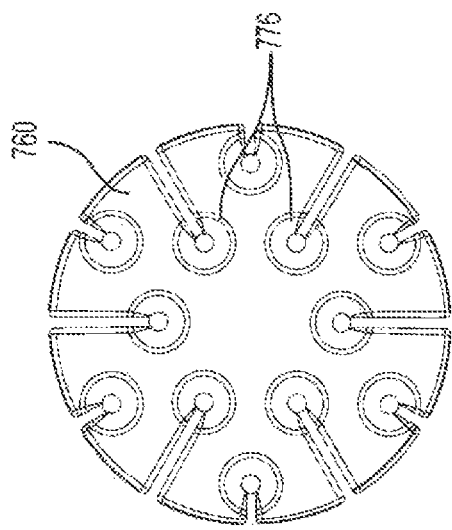
FIG. 22 is a schematic plan view of another illustrative embodiment of a spacing hub of an illustrative embodiment of a bundle organizer.

In one illustrative embodiment, the spacing hub 760 is a formed member having the channels 764 with outside slots 772 or openings on an exterior and the exterior wrap 652 tightens the channels 764 to hold the distribution fibers or distribution connectors 644 therein when in an assembled position and wherein some of the channels 764 are on a periphery of the spacing hub 760 and some are on an interior of the spacing hub 760 (see FIG. 22).

Referring again primarily to FIGS. 19-22, the spacing hubs 760 may have a diameter of D and a longitudinal length of in the range of 0.2 D to 0.5 D, and in one illustrative embodiment, the longitudinal length, or thickness, is 0.3D. In some illustrative embodiments, the thickness may be less still, as noted with respect to FIG. 23, e.g., 0.01 D to 0.1 D. In this embodiment, the wrap 652 bundles the grouped fibers 596.

Referring now primarily to FIGS. 24-27 and to a lesser extent to FIGS. 11 and 12, the plurality of fibers 596 have a plurality of distribution connectors 644 coupled to the distal ends 646 that in one embodiment may be held in an organized, patterned fashion by a plurality of bundle organizers 648. Each of the plurality of bundle organizers 648 helps to form a substantially circular—or arcuate—or polygon arrangement of the involved connectors 644 by gripping the connector boots 650 or a portion of the connector housing 654. Each of the plurality of bundle organizers 648 in some embodiments involve an independent set of 12 fibers 596 with four or six groups. Each of the plurality of bundle organizers 648 includes a spacing hub 760, and in this illustrative embodiment the spacing hub 760 comprises an adhesive tape 780. The bundle organizer 648 further includes an exterior wrap 652 for surrounding or otherwise securing the spacing hub 760 in the generally circular, arcuate, or polygon pattern with the connectors 644 therein.

Figure 24:
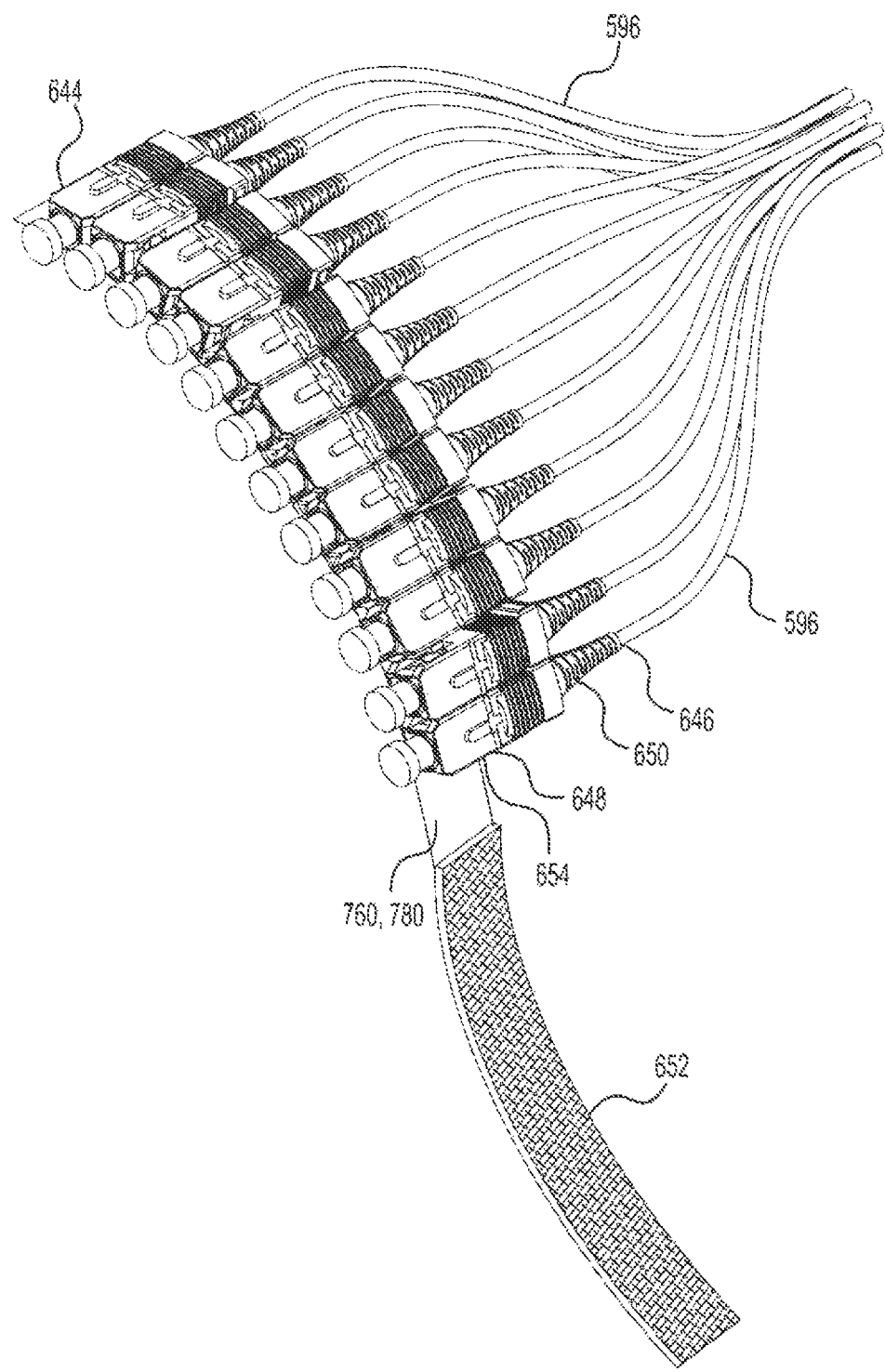
FIG. 24 is a schematic, perspective view of another illustrative embodiment of a bundle organizer for holding a plurality of fibers with distribution connectors coupled to the distal ends in a first position during assembly.
Figure 25:
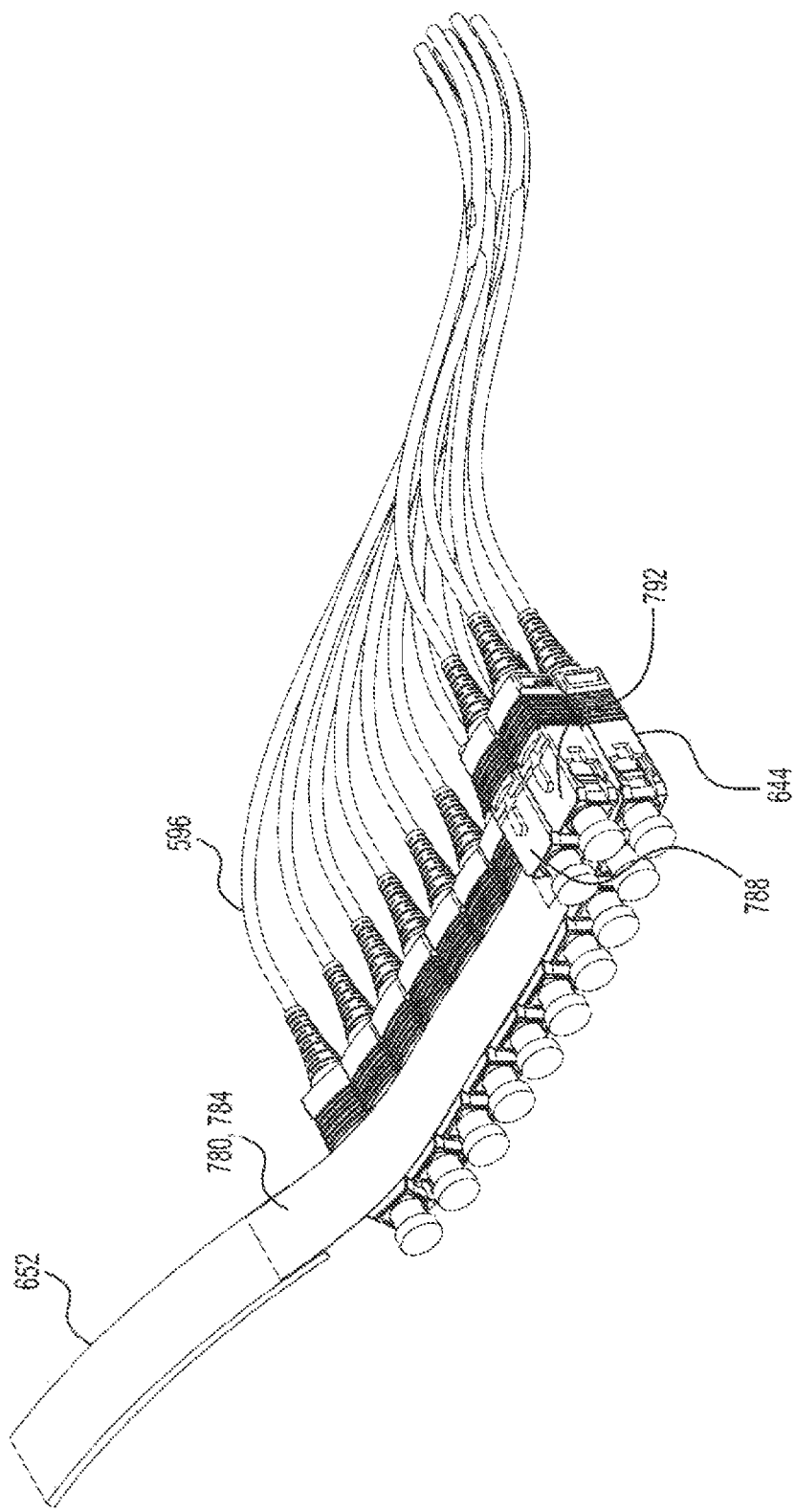
FIG. 25 is a schematic, perspective view of the illustrative embodiment of the bundle organizer of FIG. 24 shown in a second position during assembly.
Figure 26:
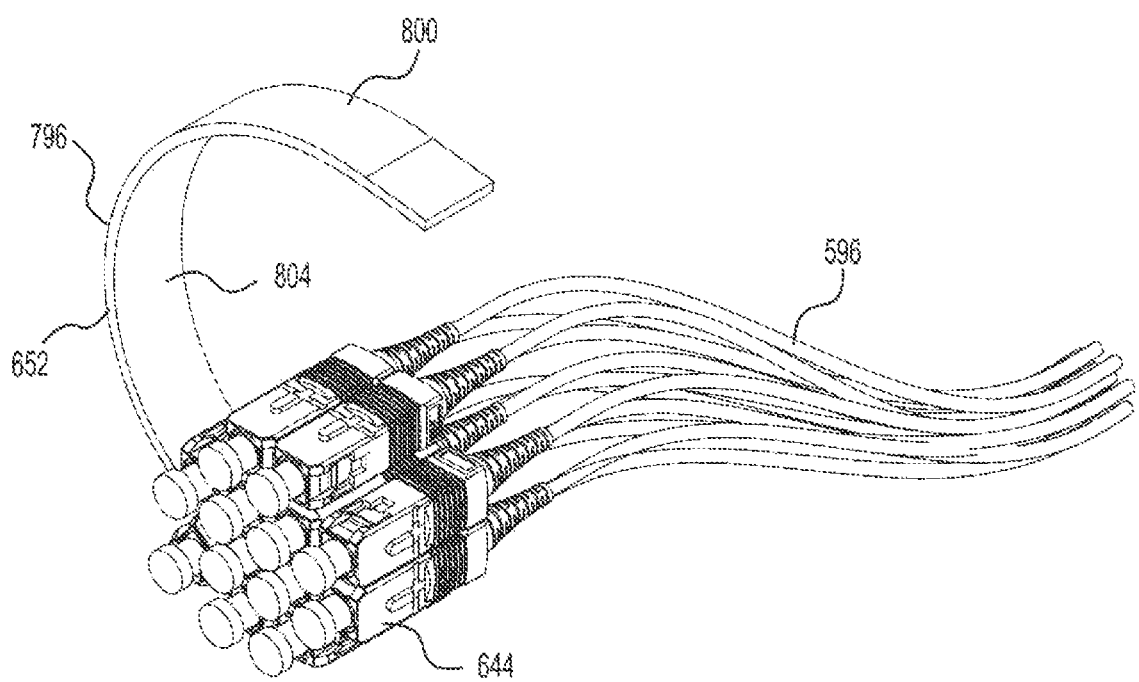
FIG. 26 is a schematic, perspective view of the illustrative embodiment of the bundle organizer of FIG. 24 shown in a third position during assembly.

FIG. 24 shows an initial step of placing the plurality of connectors 644 for a cable grouping or bundle on the adhesive tape 780, and typically with the connector housing 654 or connector boots 650 on the adhesive tape 780. The plurality of connectors 644 may be adjacent to one another with a small gap (or touching) between adjacent connectors 644. As shown in FIG. 25, a couple of the connectors 644 on the adhesive tape 780 may be turned over so that a portion of the back 784 of the tape 780 touches another portion of the back 784 to form a starting center for rolling the tape 780. Two connectors 788, 792 have been flipped in this manner and in other embodiments it might be one or three or another number. Then, the back 784 of the tape 780 is further rolled around the connectors 644 to arrive at a position like that shown in FIG. 26 in which all the connectors have been rolled in the adhesive tape 780. A tail 796 formed or extending from the tape 780 comprises the wrap 652.

Figure 27:
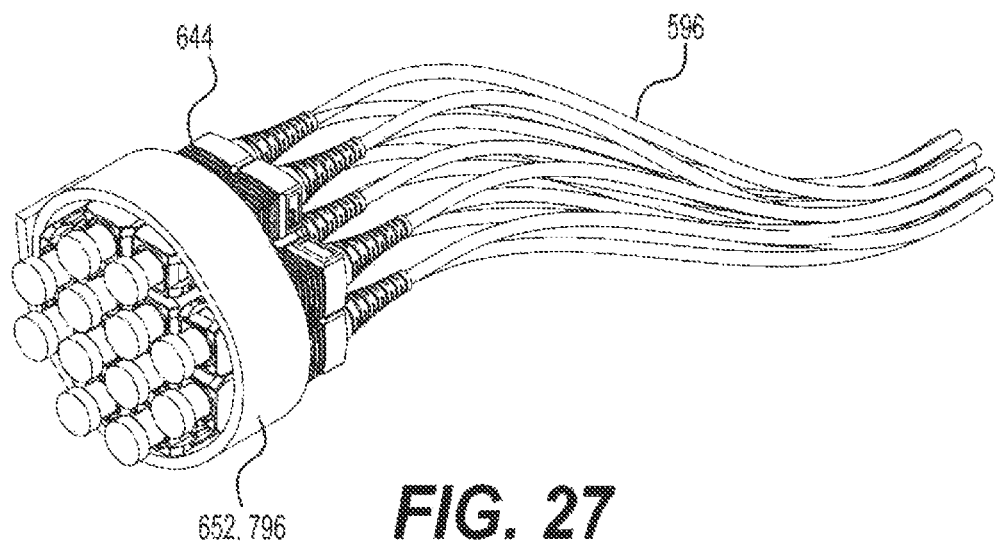
FIG. 27 is a schematic, perspective view of the illustrative embodiment of the bundle organizer of FIG. 24 shown in an assembled position.

The wrap 652 or tail 796 has a first or outward facing side (loop side in one embodiment) 800 and a second or inward facing side (hook side in one embodiment) 804. The second side 804 contacts the connectors 644. The first side 800 and second side 804 may each have a constituent member of a hook-and-loop adhesive arrangement so that when rolled, the wrap 652 or tail 796 may be secured in a final position as shown in FIG. 27 and may be released by pulling the wrap 652 or tail 796 when ready to access any of the connectors 644 therein.

Figure 28:
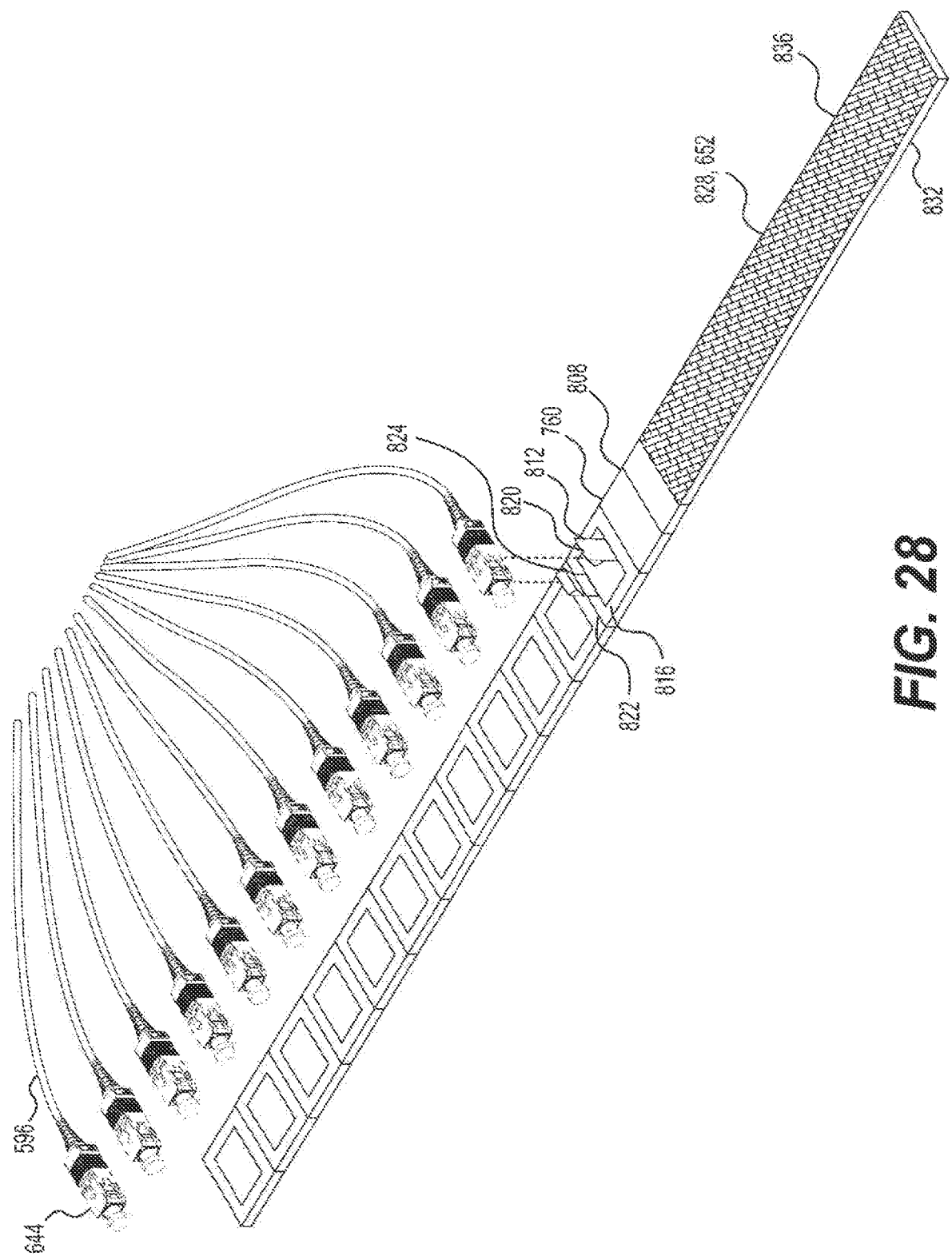
FIG. 28 is a schematic, perspective view of another illustrative embodiment of a bundle organizer for holding a plurality of fibers with distribution connectors coupled to the distal ends.

Referring now primarily to FIG. 28, another illustrative embodiment of one of a plurality of bundle organizers 648 is presented that includes a spacing hub 760, and in this illustrative embodiment, the spacing hub 760 comprises a material 808 that will be rolled in a fashion analogous to that shown in FIGS. 24-27, except instead of an adhesive tape, a plurality of clasps 812 are placed side by side on the material 808—only one is shown for convenience and clarity. The clasps 812 are coupled to a surface 816 on the material 808 into which the connectors 644 may be removably coupled. The clasps 812 may have flexible walls 820 with latching barbs 824. A living hinge 822 or other flexible point may be formed between adjacent clasps 812. After securing the connectors 644 in the clasps 812, the material 808 is rolled to form the generally circular or arcuate or polygon shape of a fiber grouping. As with the illustrative embodiment of FIGS. 24-27, a tail 828 forms the wrap 652 that is used to secure the group in the circular or arcuate or polygon pattern. The tail 828 may be an extension of the linear material 808 or a different material that is coupled. The tail 828 has a first side 832 and an opposing second side 836. As with the previous embodiment, complimentary components of a hook-and-loop arrangement may be secured to the first side 832 and second side 836 so that when rolled, a portion of the first side 832 will adhere to a portion of the second side 836.

In another illustrative embodiment, the connector 644 may be formed into a circular pattern and wrapped sans spacing hub and yet still forming the fiber grouping. While a hook-and-loop arrangement is presented with respect to the wrap in FIGS. 19-28, it should be understood that any releasable securing means may be used, including a belt, snap, tie, magnet, rubber band, etc.

In operation, the fiber distribution hub and methods may provide a number of potential benefits. The bundling of the fibers with colored coding allows for easy and convenient access. The staggering and spacing of the storage spools may also help with convenient access.

In one illustrative embodiment, the cabinet 504 is delivered in the configuration shown in FIG. 11 with the fibers 596 hanging. In some embodiments, the fibers 596 may be secured to a panel, e.g., back panel 518, for shipping and the fiber groupings may be put in bags.

When ready for use, the cabinet 504 looks like that shown in FIG. 10. When a customer is ready for subscription, the ticket from central office might say something like connect fiber #288. In that case, the last fiber in the cabinet needs to be turned up first. Of the distribution cables 596, the particular distribution cable 597 (FIG. 11) enters the cabinet 504 and because it is the last of 144 on that cable, it would be the last bundle on the left side, which would be the aqua bundle with respect to the color on the wrap 652. The technician would then pull the aqua wrapped fiber group or bundle from the storage area 604 and from its storage spool 600 and un-do the wrap 652, select the last connector, fiber 288, from that group and then dress it in the splitter area and terminate connector to the next available splitter module port.

The particular fiber that was segregated and terminated is then dressed through the bridle ring 620 below splitter module then through the nearest bridle ring 620 below the vertical cable management tower 608 up through the vertical cable management tower 608 and over spool that best manages the slack fiber. If adequate length exists, route fiber through the bridle ring 620 nearest to fiber exit side and below vertical cable management tower.

In one illustrative embodiment, a fiber distribution hub for use in a passive optical network includes a cabinet having an interior portion defining an interior space; a top rail and a bottom rail coupled to a portion of the interior portion of the cabinet or an internal frame. The top rail and bottom rail are displaced from one another and extend longitudinally in a first direction that is perpendicular to a gravity field. The hub includes at least one splitter coupled between the top rail and bottom rail and a plurality of vertical cable management spools coupled to the internal frame or the cabinet and positioned between the top rail and the bottom rail. The hub also has a plurality of storage spools coupled to the internal frame or the cabinet and positioned to one side of the plurality of cable management spools and a plurality of yet-to-be-used distribution fibers grouped into a plurality of fiber groups. The plurality of storage spools is for holding the plurality of yet-to-be-used distribution fibers. The hub also includes a plurality of distribution connectors coupled to ends of the plurality of yet-to-be-used distribution fibers and a plurality of bundle organizers associated with the plurality of distribution connectors of the yet-to-be used distribution fibers. In one embodiment, each of the plurality of bundle organizers has a plurality of channels for receiving distribution connectors. In another embodiment, the bundle organizer includes an adhesive tape or material with clasps.

In one illustrative embodiment, a fiber distribution hub for use in a passive optical network includes a cabinet having an interior portion defining an interior space and a vertical cable management tower extending vertically from a bottom portion of the cabinet or cabinet frame and having a plurality of cable management spools. The vertical cable management tower is coupled to the cabinet or cabinet frame to define a splitter area to one side and a storage area to another side. The fiber distribution hub further includes a plurality of storage spools coupled to the cabinet or cabinet frame in the storage area; and a plurality of distribution cables introduced into the interior space of the cabinet and having distribution fibers formed into a plurality of fiber groups at distal ends of the distribution fibers, wherein the plurality of distribution cables is positioned to drape over one or more of the plurality of storage spools for storage until use.

In one illustrative embodiment, a method of managing fibers within a fiber distribution hub for use in a passive optical network includes providing a cabinet having a first rail separated longitudinally from a second rail and having at least one splitter module between the first rail and second rail, a cable management stand having a plurality of spools, and a plurality of storage spools also disposed between the first rail and second rail; introducing at least one feeder cable into the interior space of the cabinet, the at least one feeder cable having a plurality of distribution fibers with distribution connectors on distal ends; forming a plurality of bundles with a plurality of bundle organizers, each bundle organizer holding a plurality of the distribution connectors or distribution fibers in a spaced relationship; disposing the plurality of bundles over the plurality of storage spools; and coupling at least one of the distribution fibers to the at least one splitter module and using the cable management stand to store any slack in the at least one distribution fiber.

Certain terminology maybe used in this description for convenience only and is not limiting. The words "lower," "bottom," "upper," "top," "right" and "left" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import. It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A fiber distribution hub for use in a passive optical network, the fiber optic distribution hub comprising:
    a cabinet having an interior portion defining an interior space;
    a top rail and a bottom rail coupled to a portion of the interior portion of the cabinet or an internal frame, and wherein the top rail and bottom rail are displaced from one another and extend longitudinally in a first direction that is perpendicular to a gravity field;
    at least one splitter module coupled between the top rail and bottom rail;
    a plurality of vertical cable management spools coupled to the internal frame or the cabinet and positioned between the top rail and the bottom rail;
    a plurality of storage spools coupled to the internal frame or the cabinet and positioned to one side of the plurality of cable management spools;
    a plurality of yet-to-be-used distribution fibers grouped into a plurality of fiber groups, wherein the plurality of storage spools is for holding the plurality of yet-to-be-used distribution fibers;
    a plurality of distribution connectors coupled to ends of the plurality of yet-to-be-used distribution fibers; and
    a plurality of bundle organizers associated with the plurality of distribution connectors of the yet-to-be used distribution fibers, each of the plurality of bundle organizers for receiving and releasably holding distribution connectors.

2. The fiber distribution hub of claim 1, wherein each of the plurality of bundle organizers comprises a spacing hub having channels or through-holes for receiving distribution fibers and an exterior wrap for surrounding the spacing hub and securing the distribution fibers therein.

3. The fiber distribution hub of claim 2, wherein the spacing hub comprises a formed member having channels on an exterior with outside slots on an exterior and the exterior wrap tightens the channels to hold the distribution fibers or distribution connectors therein when in an assembled position and wherein the channels are on a periphery of the spacing hub.

4. The fiber distribution hub of claim 3, wherein the spacing hub has a diameter of D and a longitudinal length of at least 0.3D.

5. The fiber distribution hub of claim 3, wherein the spacing hub comprises a plate.

6. The fiber distribution hub of claim 2, wherein the spacing hub comprises a tape for releasably coupling to the plurality of distribution connectors and wherein the tape with the plurality of distribution connectors is rolled into a circular pattern as seen from an end.

7. The fiber distribution hub of claim 2, wherein the spacing hub comprises a formed member having channels with outside slots on an exterior and the exterior wrap tightens the channels to hold the distribution fibers or distribution connectors therein when in an assembled position and wherein some of the channels are on a periphery of the spacing hub and some are on an interior of the spacing hub.

8. The fiber distribution hub of claim 3, wherein the plurality of fiber groups comprises at least two fiber groups.

9. The fiber distribution hub of claim 2, wherein the wrap is colored coordinated according to Telecommunications Industry Association's TIA-598-C Optical Fiber Cable Color Coding.

10. The fiber distribution hub of claim 2, wherein the spacing hub comprises a tape for releasably coupling to the plurality of distribution connectors and wherein the tape with the plurality of distribution connectors is rolled into a circular pattern as seen from an end and wherein the plurality of fiber groups comprises at least two fiber groups.

11. The fiber distribution hub of claim 2, wherein the spacing hub comprises a tape for releasably coupling to the plurality of distribution connectors and wherein the tape with the plurality of distribution connectors is rolled into a circular pattern as seen from an end and wherein the wrap is colored coordinated according to Telecommunications Industry Association's TIA-598-C Optical Fiber Cable Color Coding.

12. The fiber distribution hub of claim 1, further comprising metal bridle rings coupled proximate the bottom rail.

13. The fiber distribution hub of claim 1, wherein each of the bundle organizers of the plurality of bundle organizers forms a circular pattern with the plurality of yet-to-be-used distribution fibers therein.

14. The fiber distribution hub of claim 1, wherein the at least one splitter module coupled between the top rail and bottom rail extends longitudinally parallel to the gravity field.

15. The fiber distribution hub of claim 1, further comprising a plurality of spool support arms coupled to the cabinet or cabinet frame, and wherein the plurality of storage spools is coupled to the plurality of spool support arms.

16. The fiber distribution hub of claim 1, further comprising a top shelf coupled to the cabinet and a bottom shelf coupled to the cabinet, and wherein the top rail comprises the top shelf and the bottom rail comprises the bottom shelf.

17. The fiber distribution hub of claim 14, wherein the top shelf has a plurality of slots of which each slot is for receiving a portion of the cabinet therein in an assembled position.

18. The fiber distribution hub of claim 1, further comprising:
    wherein the spacing hub comprises a formed member having channels on an exterior with outside slots on an exterior and the exterior wrap tightens the channels to hold the distribution fibers or distribution connectors therein when in an assembled position and wherein the channels are on a periphery of the spacing hub;
    wherein the spacing hub has a diameter of D and a longitudinal length of at least 0.3D;
    wherein the plurality of fiber groups comprises at least two fiber groups;
    wherein the wrap is colored coordinated according to Telecommunications Industry Association's TIA-598-C Optical Fiber Cable Color Coding;
    metal bridle rings coupled proximate the bottom rail;
    wherein each of the bundle organizers of the plurality of bundle organizers forms a circular pattern with the plurality of yet-to-be-used distribution fibers therein;
    wherein the at least one splitter module coupled between the top rail and bottom rail extends longitudinally parallel to the gravity field; and
    a plurality of spool support arms coupled to the cabinet or cabinet frame, and wherein the plurality of storage spools is coupled to the plurality of spool support arms;

a top shelf coupled to the cabinet and a bottom shelf coupled to the cabinet, and wherein the top rail comprises the top shelf and the bottom rail comprises the bottom shelf; and wherein the top shelf has a plurality of slots of which each slot is for receiving a portion of the cabinet therein in an assembled position.

19. The fiber distribution hub of claim 17, further comprising a plurality of bundle organizers, and wherein each of the plurality of bundle organizers holds one of the plurality of fiber groups, and wherein each of the plurality of bundle organizers comprises a spacing hub for receiving distribution fibers and comprises an exterior wrap for surrounding the spacing hub and securing the distribution fibers therein.

20. The fiber distribution hub of claim 18, further comprising:
a plurality of bundle organizers, wherein each of the plurality of bundle organizers holds one of the plurality of fiber groups; and
wherein the plurality of bundle organizers comprises a plurality of spacing hubs, each spacing hub having channels or through-holes for receiving distribution fibers and further comprising an exterior wrap for surrounding the spacing hub and securing the distribution fibers therein, and wherein the channels are on a periphery of the spacing hub.

21. The fiber distribution hub of claim 18, further comprising:
a plurality of bundle organizers, wherein each of the plurality of bundle organizers holds one of the plurality of fiber groups; and
wherein the plurality of bundle organizers comprises a plurality of spacing hubs, each spacing hub comprising an adhesive tape for receiving distribution fibers and further comprising an exterior wrap for surrounding the spacing hub and securing the distribution fibers therein.

22. A method of managing fibers within a fiber distribution hub for use in a passive optical network, the method comprising:
providing a cabinet having a first rail separated from a second rail and having at least one splitter module between the first rail and second rail, a cable management stand having a plurality of spools, and a plurality of storage spools also disposed between the first rail and second rail;
introducing at least one distribution cable into the interior space of the cabinet, the at least one distribution cable having a plurality of distribution fibers with distribution connectors on distal ends;
forming a plurality of bundles with a plurality of bundle organizers, each bundle organizer holding a plurality of the distribution connectors or distribution fibers in a spaced relationship;
disposing the plurality of bundles over the plurality of storage spools; and
coupling at least one of the distribution fibers to the at least one splitter module and using the cable management stand to store any slack in the at least one distribution fiber.

23. The method of claim 22, wherein the cabinet further comprises a plurality of bundle organizers, and the method further comprises forming a plurality of bundles with a plurality of bundle organizers comprises, for each of the plurality of bundle organizers, inserting the distribution fibers or distribution connectors through a plurality of channels in a bundle organizer.

24. A fiber distribution hub for use in a passive optical network, the fiber optic distribution hub comprising:
a cabinet having an interior portion defining an interior space;
a top rail and a bottom rail coupled to a portion of the interior portion of the cabinet or an internal frame, and wherein the top rail and bottom rail are displaced from one another and extend longitudinally in a first direction that is perpendicular to a gravity field;
at least one splitter modules coupled between the top rail and bottom rail;
a plurality of vertical cable management spools coupled to the internal frame or the cabinet and positioned between the top rail and the bottom rail;
a plurality of storage spools coupled to the internal frame or the cabinet and positioned to one side of the plurality of cable management spools;
a plurality of yet-to-be-used distribution fibers grouped into a plurality of fiber groups, wherein the plurality of storage spools is for holding the plurality of yet-to-be-used distribution fibers;
a plurality of distribution connectors coupled to ends of the plurality of yet-to-be-used distribution fibers;
a plurality of bundle organizers associated with the plurality of distribution connectors of the yet-to-be used distribution fibers, each of the plurality of bundle organizers comprises a spacing hub and wherein the spacing hub comprises an adhesive tape for releasably coupling to the plurality of distribution connectors and wherein the adhesive tape with the plurality of distribution connectors is rolled into a arcuate pattern as seen from an end, and wherein an extension of the adhesive tape comprises a wrap for holding the distribution connectors in the circular pattern;
wherein the plurality of fiber groups comprises at least two fiber groups;
wherein the wrap is colored coordinated according to Telecommunications Industry Association's TIA-598-C Optical Fiber Cable Color Coding;
metal bridle rings coupled proximate the bottom rail;
wherein the at least one splitter modules coupled between the top rail and bottom rail extends longitudinally parallel to the gravity field;
a plurality of spool support arms coupled to the cabinet or cabinet frame, and wherein the plurality of storage spools is coupled to the plurality of spool support arms;
a top shelf coupled to the cabinet and a bottom shelf coupled to the cabinet, and wherein the top rail comprises the top shelf and the bottom rail comprises the bottom shelf; and
wherein the top shelf has a plurality of slots of which each slot is for receiving a portion of the cabinet therein in an assembled position.

* * * * *